United States Patent

Kitajima et al.

[11] Patent Number: 5,561,440
[45] Date of Patent: Oct. 1, 1996

[54] LIQUID CRYSTAL DISPLAY DEVICE AND DRIVING METHOD THEREFOR

[75] Inventors: Masaaki Kitajima, Hitachiota; Makoto Tsumura, Hitachi; Yoshiro Mikami, Hitachi; Katsuyuki Funahata, Hitachi; Yoshiharu Nagae, Hitachi; Yoko Wakui, Ibaraki-ken; Ryuichi Saito, Hitachi; Makoto Matsui, Kunitachi; Fumiaki Nemoto, Hitachi, all of Japan

[73] Assignees: Hitachi, Ltd., Tokyo; Hitachi Haramachi Semi-Conductor, Ltd., Hitachi, both of Japan

[21] Appl. No.: 741,752

[22] Filed: Aug. 7, 1991

[30] Foreign Application Priority Data

Aug. 8, 1990 [JP] Japan ..................... 2-208107

[51] Int. Cl.⁶ .............................. G02F 1/133; G09F 9/35
[52] U.S. Cl. .................................. 345/87; 359/67
[58] Field of Search ..................... 359/55, 58, 62, 359/67, 68, 66, 59, 88; 340/784; 345/90, 92, 87

[56] References Cited

U.S. PATENT DOCUMENTS

| | | | |
|---|---|---|---|
| 4,103,297 | 7/1978 | McGreivy et al. | 345/90 |
| 4,770,498 | 9/1988 | Aoki et al. | 359/67 |
| 4,824,213 | 4/1989 | Morokawa | 359/67 |
| 5,132,830 | 7/1992 | Fukutani et al. | 359/67 |
| 5,162,933 | 11/1992 | Kakuda et al. | 359/67 |
| 5,327,001 | 7/1994 | Wakai et al. | 359/59 |

FOREIGN PATENT DOCUMENTS

| | | |
|---|---|---|
| 1297623 | 11/1989 | Japan. |
| 2-10955 | of 1990 | Japan. |

*Primary Examiner*—Richard Hjerpe
*Assistant Examiner*—Kara Farnandez Stoll
*Attorney, Agent, or Firm*—Antonelli, Terry, Stout & Kraus

[57] ABSTRACT

A liquid crystal active matrix display device includes a first substrate having a thin film transistor formed thereon. A light-screening film 1 is located on the first substrate in a manner to be overlapped with an ITO. The display device includes a second substrate having a color filter and a light-screening film 2 formed thereon. The second substrate is opposed to the first substrate. The light-screening film 2 extends from the uncontrollable area by a certain value depending on a voltage from the external, resulting in improving a numerical aperture.

29 Claims, 26 Drawing Sheets

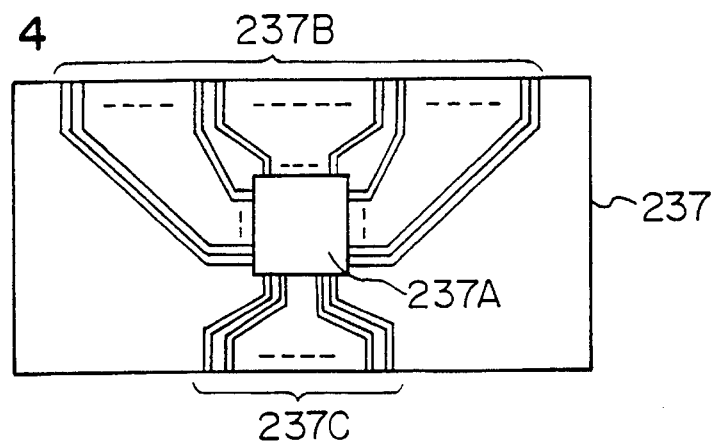
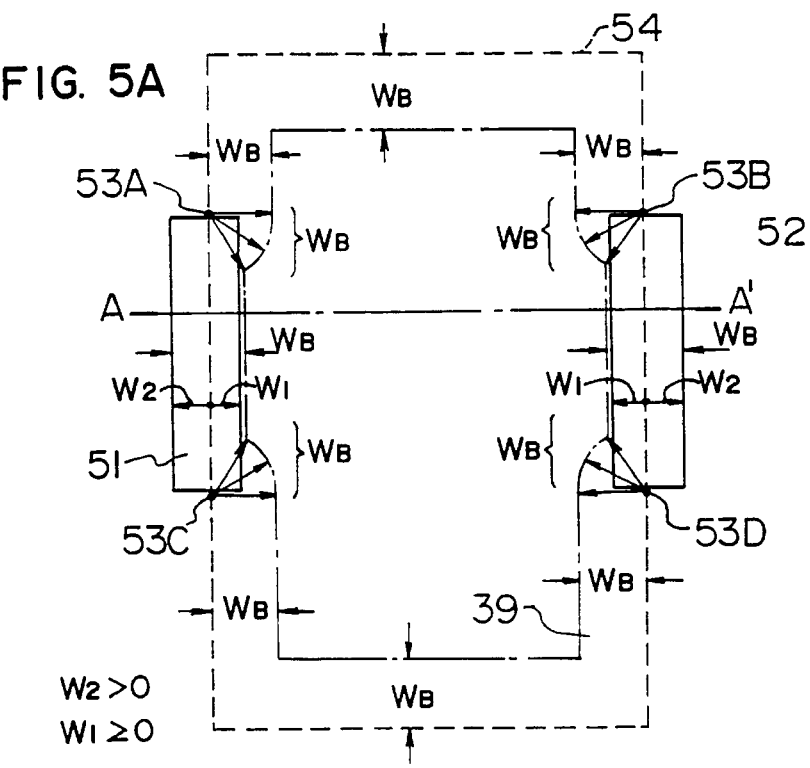
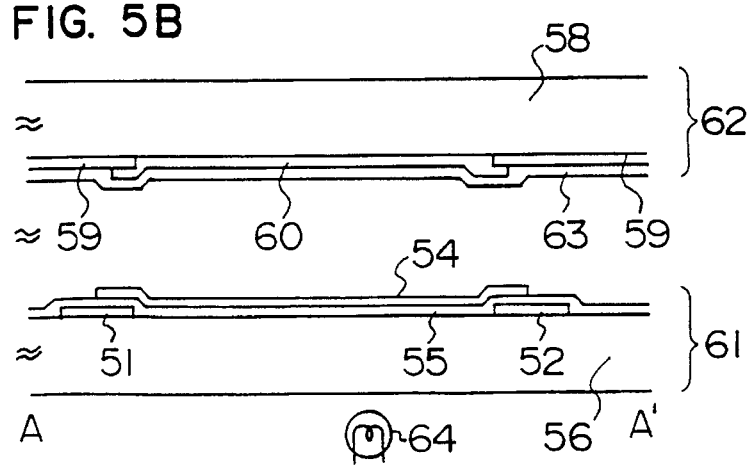

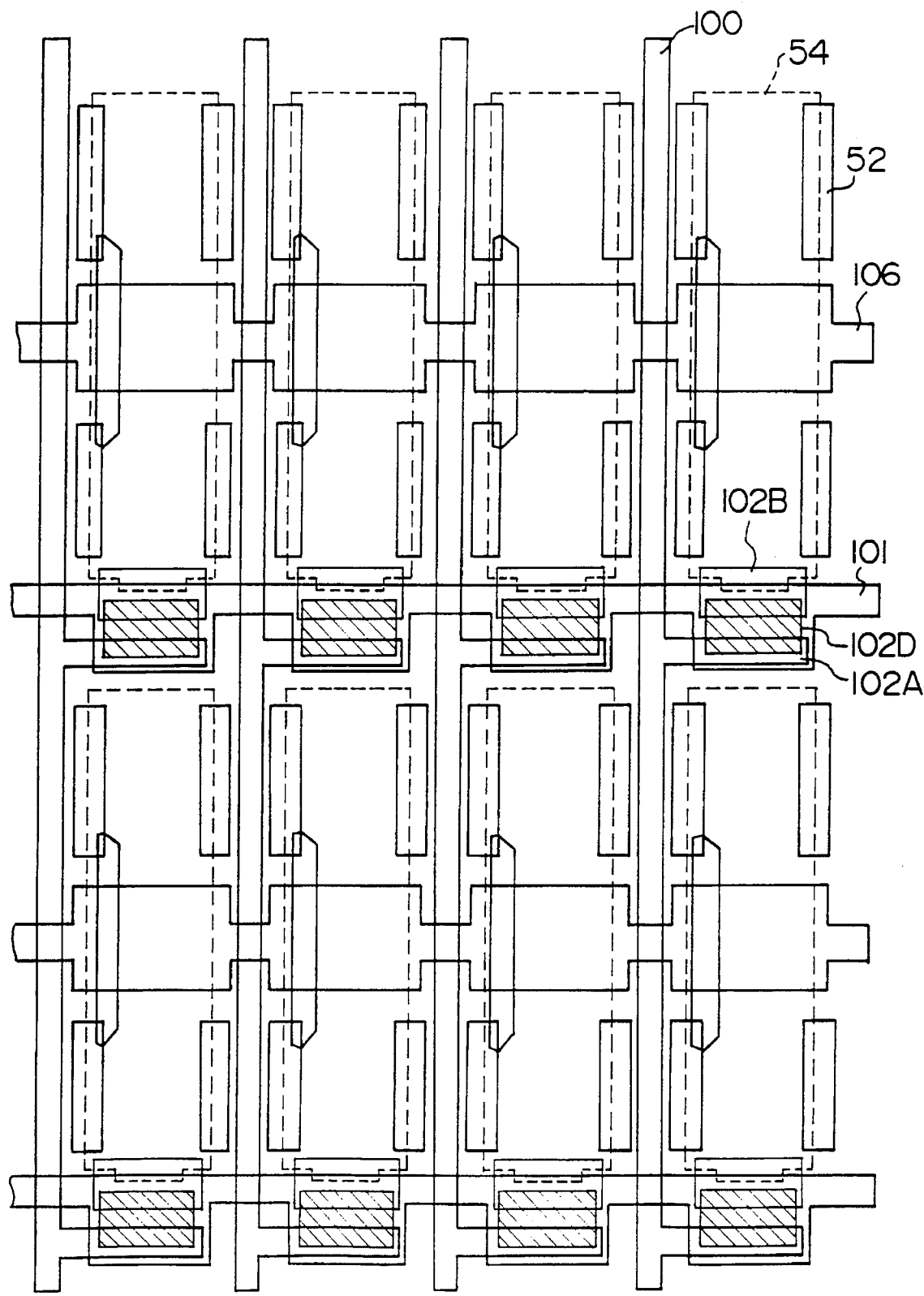

LIQUID CRYSTAL DISPLAY DEVICE AND DRIVING METHOD THEREFOR

BACKGROUND OF THE INVENTION

The present invention relates to a liquid crystal display device and more particularly to the structure and the driving method of the display device which provides a high-quality display.

The conventional liquid crystal display device is constructed to have an active matrix substrate and a light-screening mask formed thereon so that the display device can provide a high-contrast panel as disclosed in JP-A-1-297623. This construction, however, has a shortcoming that the application of the construction to, in particular, a high-definition liquid crystal display device results in lowering a contrast ratio.

As disclosed in JP-A-2-10955, a storage capacitance element may be provided in parallel to a liquid crystal unit so as to suppress reduction of stored charges resulting from leakage current of a thin film transistor or a liquid crystal unit and diminish variation of an effective voltage. However, this storage capacitance element also has some difficulty in working the form of each element located on the substrate to be uniform on the plane of the substrate if the liquid crystal device is required to be more definitive and larger in size, resulting in disadvantageously making the dimensions of the elements provided on the substrate variable. The variation leaves an after image on the display device and degrades the liquid crystal.

SUMMARY OF THE INVENTION

It is therefore an object of the present invention to provide a high-definition liquid crystal display device which is capable of diminishing leakage of light for realizing a high-contrast display and making a numerical aperture larger for providing a brighter display.

It is still another object of the present invention to provide a high-definition liquid crystal display device having structure of a storage capacitance element which is designed to diminish variation of a storage capacitance element located on a common potential electronic plane, the occurrence of short-circuit between wires, and a water mark for the purpose of improving a yield.

It is another object of the present invention to provide a driving method of the storage capacitance elements located on the liquid crystal display device which method is suitable to the reduction of variations of a common electric potential and a threshold value.

In order to achieve the foregoing objects, the present invention is constructed to provide an opaque material on one substrate having a thin film transistor formed thereon and an opaque material on another substrate having a color filter formed thereon so that those opaque materials serve to screen light applied from an area uncontrolled in response to an external voltage (signal voltage, scan voltage, etc.). The opaque materials keep a predetermined distance from the uncontrollable area. Further, in a TFT (thin film transistor) driving system liquid crystal device having two or more pixels located thereon including a first wire served as a scan signal line, a field-effect transistor (FET) whose gate electrode is connected to the first wire, a second wire served as a signal line and being connected to one of a drain and a source electrodes of the FET, a storage capacitance element one electrode of which is connected to the other of the drain and the source electrodes of the FET, a liquid crystal element one electrode of which is connected to the other of the drain and the source electrodes of the FET, a third electrode connected to the other electrode of the storage capacitance element, and a fourth electrode connected to the other electrode of the liquid crystal element and to the third electrode, the TFT driving system liquid crystal device is characterized in that a peripheral length µm of a capacitance section of the storage capacitance element is 1.33 time as large as or lower than a value obtained by dividing an area µm$^2$ of the capacitance section by a diagonal length of an area where the pixels are located and the third and the fourth electrodes are connected to a common electrode signal line. The capacitance section of the storage capacitance element has vertical and horizontal end portions which are terminated only on the end portions of either one of the electrodes of the storage capacitance element.

As described above, the peripheral length µm of the capacitance section of the storage capacitance element is 1.33 or less times as large as a value obtained by dividing an area µm$^2$ of the capacitance section by a diagonal length of an area where the pixels are located included in the display unit of the TFT driving system liquid crystal display device. It results in suppressing variation of areas of the storage capacitance elements, that is, variation of capacitance values resulting from the dimensional variation to a ±20% value of a central value.

BRIEF DESCRIPTION OF THE DRAWINGS

FIG. 4 is a diagram showing an embodiment of each substrate included in the liquid crystal display according to the invention;

FIG. 5A is a schematic view showing a plane and a section of each of the pixels composing a liquid crystal panel according to the invention;

FIG. 5B is a schematic view showing a section of each of the pixels composing a liquid crystal panel according to the invention;

FIG. 16 is a plan view showing a manufacture process of the liquid crystal display device according to the present invention;

DESCRIPTION OF THE PREFERRED EMBODIMENTS

Figure 1:
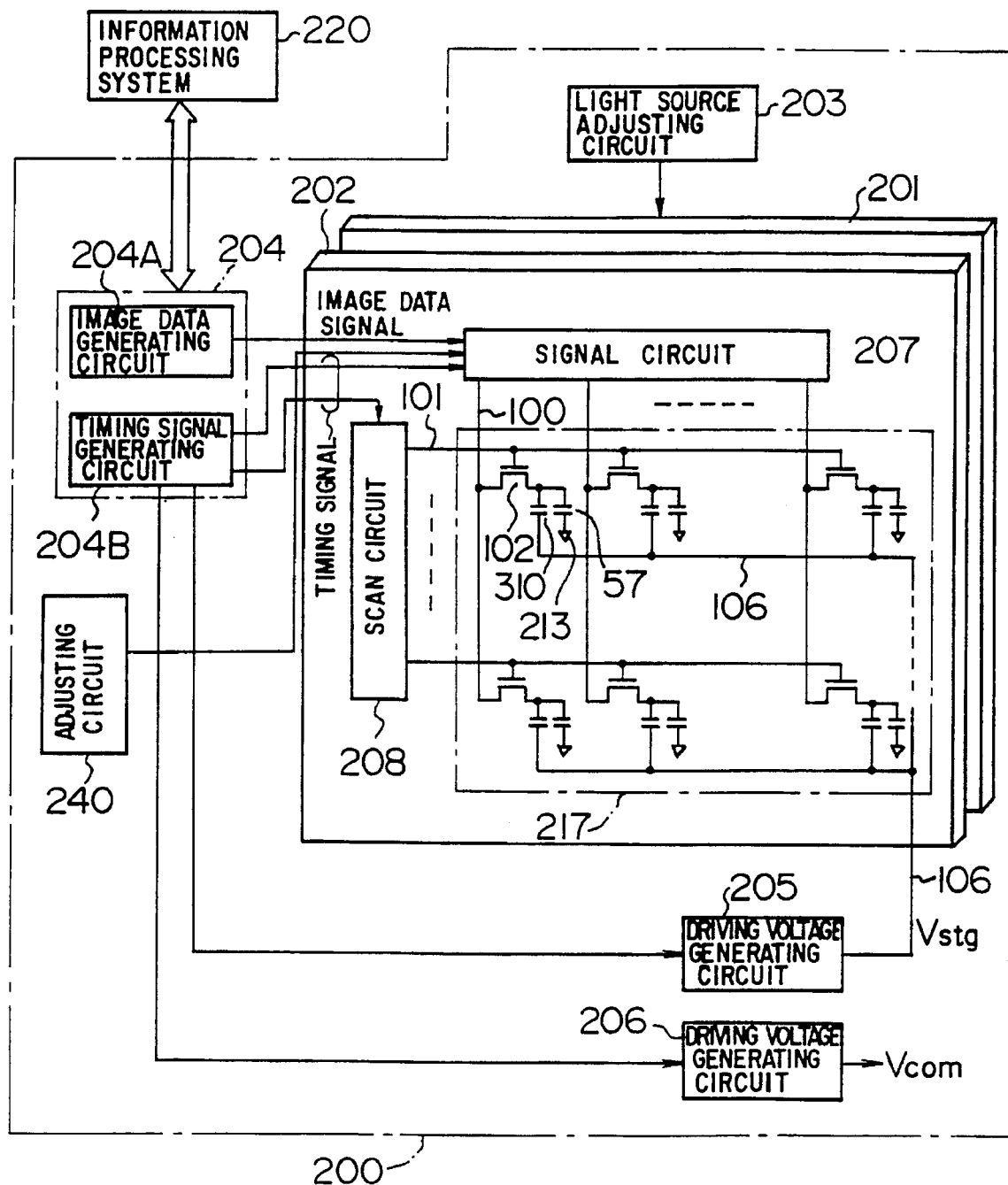
FIG. 1 is a circuit diagram showing construction of a liquid crystal display system according to an embodiment of the present invention.

Herein, an embodiment of the invention will be described with reference to the drawings. FIG. 1 shows construction of a liquid crystal display system according to an embodiment of the present invention. The liquid crystal display system is arranged to have a display system 200 and an information processing system 220 such as a work station, a personal computer, and a wordprocessor device. The display system 200 includes a liquid crystal display module 202, a light source 201, a light source adjusting circuit 203, an image data generating circuit 204A, a timing signal generating circuit 204B, a liquid-crystal brightness and contrast adjusting circuit 240, a storage capacitance driving voltage generating circuit 205, and a common electrode driving voltage generating circuit 206.

The liquid crystal display module 202 is arranged to have a liquid crystal panel 217, a signal circuit 207 for generating a signal voltage, and a scan circuit 208 for generating a scanning voltage.

The liquid crystal panel 217 is arranged to have a thin film transistor 102 composed of a-Si, p-Si or the like, a storage capacitance element 310, a liquid crystal 57, a signal line 100 for driving the thin film transistor 102, and a scan line 101. Each one electrode of the storage capacitance element 310 and the liquid crystal 57 is connected to one of a drain/source electrode of the thin film transistor 102. The other electrode of the storage capacitance element 310 is connected to a storage capacitance line 106 and the other electrode of the liquid crystal 57 is connected to a common electrode terminal 213.

The storage capacitance driving voltage generating circuit 205 serves to generate a Vstg voltage and the common electrode voltage generating circuit 206 serves to generate a Vcom voltage. The Vstg voltage is applied to the storage capacitance line 106 and the Vcom voltage is applied to the common electrode terminal 213. Those voltage are not specific and may be at the same voltage level or phase. The other of the drain/source electrode of the thin film transistor 102 is connected to the signal line 100.

The light source adjusting circuit 203 may be operated in synchronous to the liquid-crystal brightness and contrast adjusting circuit 240 and the adjusting method is not specific.

Figure 2:
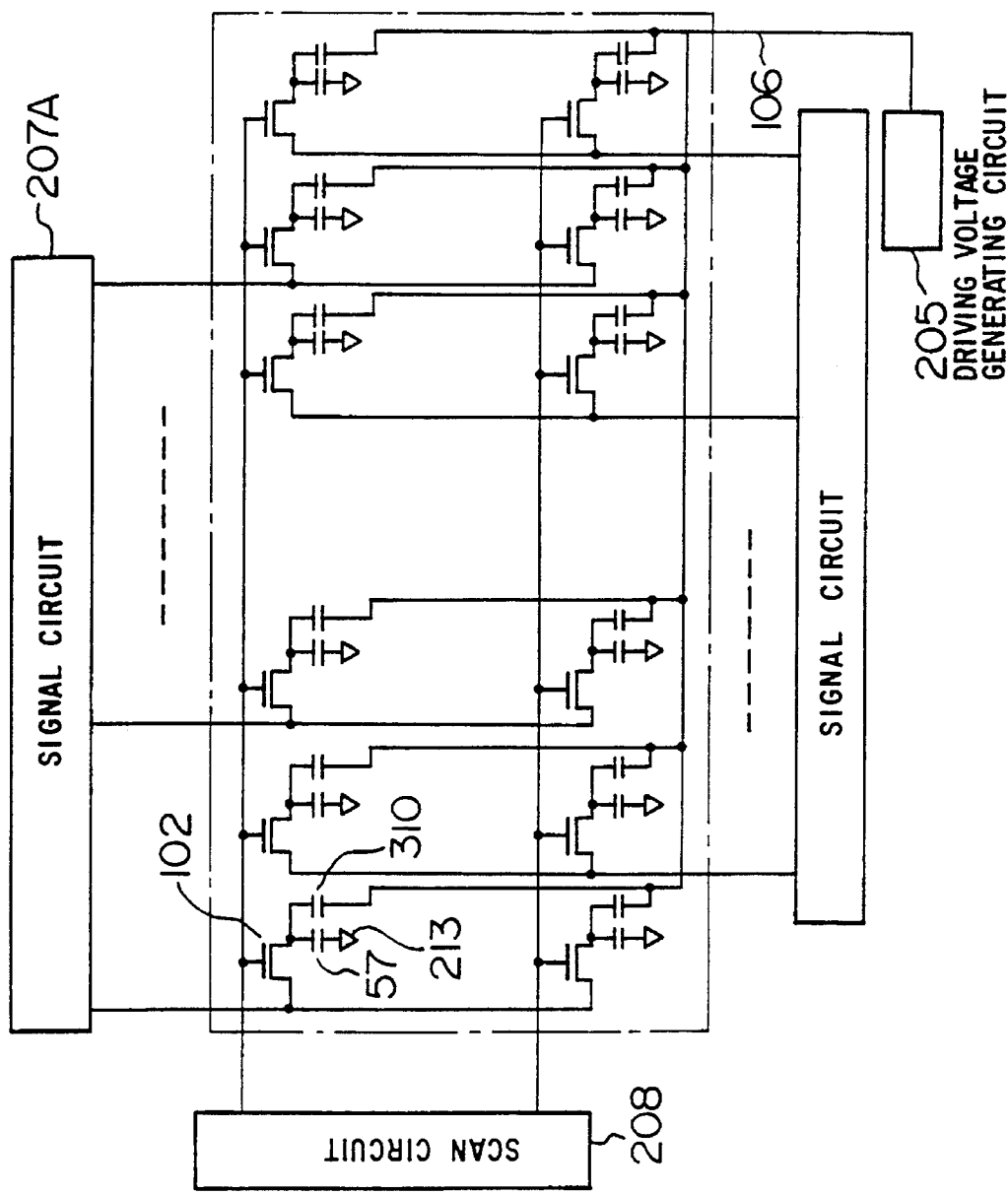
FIG. 2 is a circuit diagram showing construction of a liquid crystal display system according to an embodiment of the present invention.

Any connection may be employed as a connection between the storage capacitance element 310 and the storage capacitance line 106 without having to limit the connection shown in FIG. 2. The connection between the signal line 100 and the signal circuit 207 may be the connection shown in FIG. 2 where the signal lines are alternately pulled out in the vertical manner and are also alternately connected to the signal circuits 207A and 207B. However, the connection is not specific to the connection shown in FIG. 2. No specific connection is prepared for the connection between the scanning line 101 and the scan circuit 208, though the connection therebetween is not particularly illustrated in FIG. 2.

In FIG. 2, the signal circuit 207 and the scan circuit 208 are, in part or in all, may be formed integrally with the liquid crystal panel. The resulting device has simpler construction and higher reliability in connections or the like, hence, is advantageous in lowering the cost. In this case, the arranging means of the signal circuit and the scan circuit may take each of;

(1) Means for arranging the circuits on the liquid crystal panel 217 in the form of the thin film transistor composed of a-Si or p-Si, (2) Means for mounting a monocrystalline Si substrate having the circuits formed thereon to the liquid crystal panel 217, and (3) Means for combining said means (1) and (2).

Figure 3:
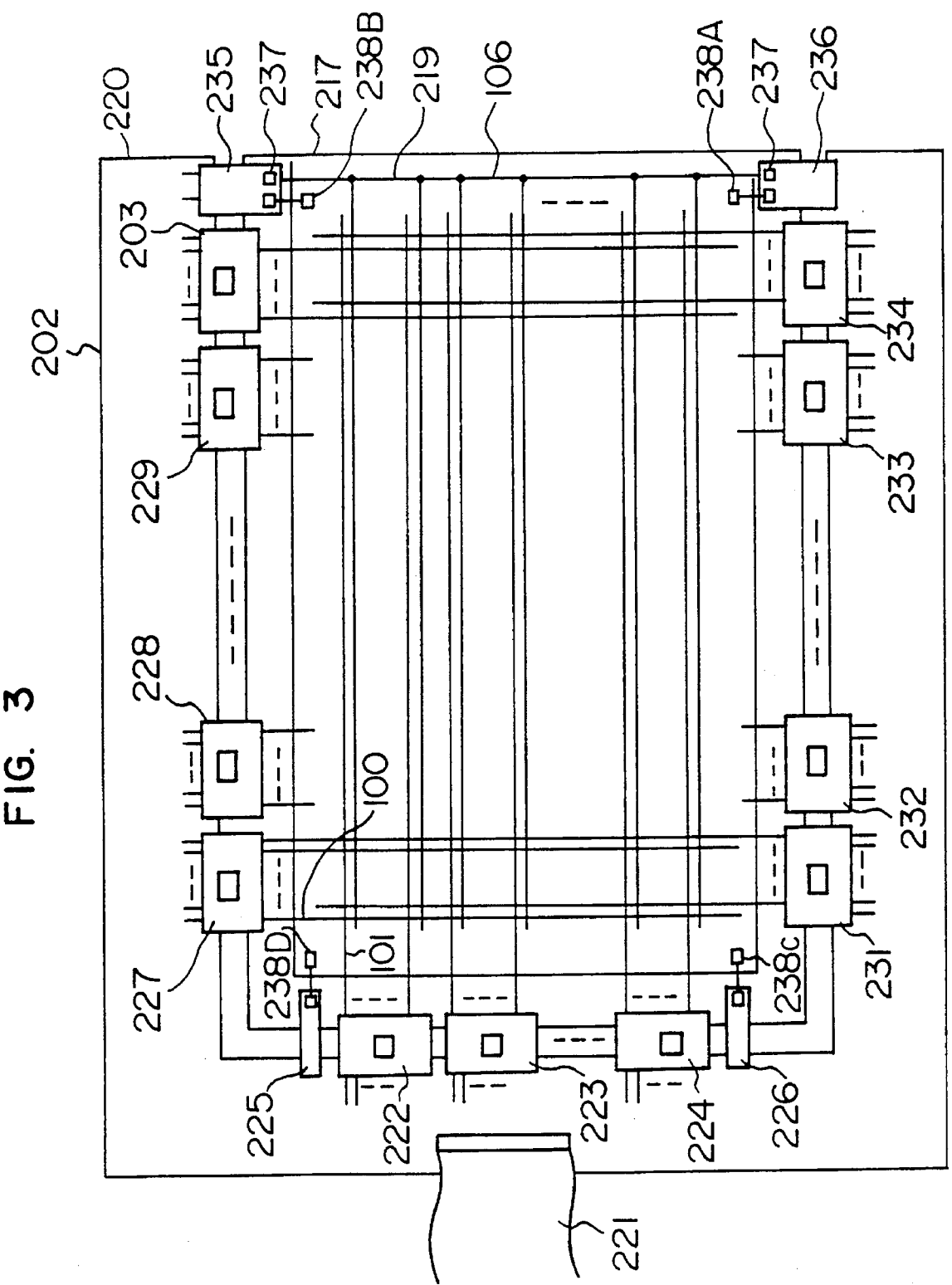
FIG. 3 is a diagram showing an embodiment of a liquid crystal display module.

FIG. 3 shows an embodiment of a liquid crystal display module 202. The liquid crystal display module 202 is arranged to have a liquid crystal panel 217, signal circuit substrates 227 to 234, scan circuit substrates 222 to 224, voltage-pulling substrates 225, 226, 235, 236 for pulling the common electrode voltage Vcom and the storage capacitance voltage Vstg, and a signal common substrate 220.

The image data generating circuit 204 supplies an image data signal and a supply voltage to the signal common substrate 220 through a signal cable 221.

FIG. 4 shows an embodiment of the signal circuit substrates 227 to 234 and the scan circuit substrates 222 to 224. Each of the circuit substrates is composed by mounting an integration circuit 237A having the signal circuit or the scan circuit formed thereon onto an organic film having pattern wires implemented thereon. The pattern wires 237B serve as output terminals for a scan voltage or a signal voltage and the pattern wires 237C serve as input terminals for the image data signal or the supply voltage.

The common electrode voltage Vcom is applied to the common electrode terminals 238A to 238D (FIG. 3) and the storage capacitance voltage Vstg is applied to the storage capacitance line 106 (FIG. 3).

In addition, it is better to employ an elastic substrate made of an organic film as the voltage-pulling substrates 225, 226, 235, 236 for implementing more convenient mounting.

FIG. 5A is a plan view schematically showing each of the pixels composing the liquid crystal panel 217 and FIG. 5B is a section view schematically showing the same. The thin film transistor 102, the scan line 101 and the signal line 100 are not illustrated in FIG. 5. With reference to FIGS. 5A and 5B, the gist of the present invention will be described.

One substrate 61 includes opaque materials 51, 52 for screening a visible ray of light applied from a backlight source 64, an insulating layer 55, and a display electrode (transparent) 54 served as a display pixel formed on a transparent base made of glass, for example. The display electrode 54 is driven by the thin film transistor 102, though it is not illustrated.

The other substrate 62 is located in opposition to the substrate 61. Both of the substrates 61 and 62 keep a gap of about 5 to 10 µm therebetween. This substrate 62 includes an opaque material 59 for screening a visible ray of light, a color filter 60 for color representation, and a common electrode (transparent) 63 formed on a transparent base made of glass, for example.

57 is a liquid crystal, which serves to control the quantity of light applied from the backlight source 64 depending on a voltage difference between the display electrode 54 and the common electrode 63.

It is preferable to employ as the liquid crystal 57 the twisted nematic liquid crystal (referred to as TNLC) where the nematic liquid crystal is twisted 90° front and back. In addition, a polymer dispersed liquid crystal (referred to as PDLC) may be used as the liquid crystal 57. That is, any liquid crystal and orientation method may be used.

Figure 6:
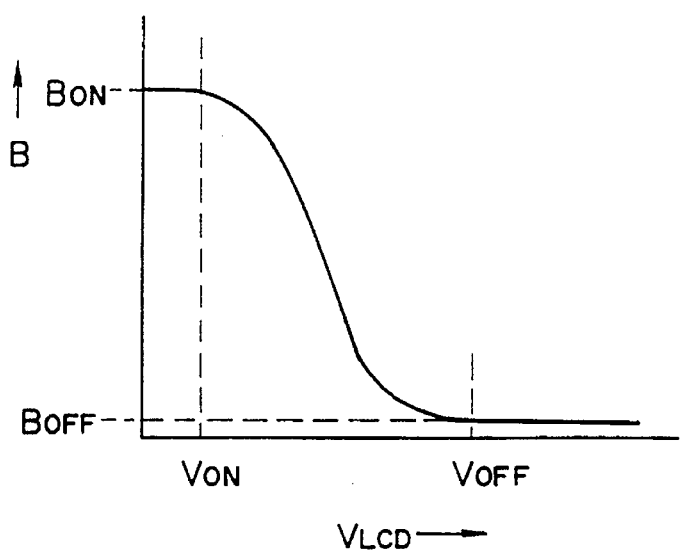
FIG. 6 is a graph showing a voltage-optical characteristic of twisted nematic (TN) liquid crystal.

FIG. 6 shows a voltage-optical characteristic of the liquid crystal 57 employing the TNLC. This type of display mode is referred to as normal white mode, at which the brightness of each pixel becomes smaller as the voltage $V_{LCD}$ applied to the liquid crystal increases.

To display an image with several tones on a TV or the like, the voltage applied to the liquid crystal is controlled to be about $V_{ON}$ to $V_{OFF}$ depending on the image signal so as to control the brightness of each pixel to be $B_{ON}$ to $B_{OFF}$, resulting in realizing color display. The significant factor for defining the display quality is a contrast ratio ($B_{ON}/B_{OFF}$). To obtain a high-quality color image, it is essential to enhance the contrast ratio ($B_{ON}/B_{OFF}$). For the purpose, it is necessary to sufficiently lower the brightness $B_{OFF}$ corresponding to the applied voltage $V_{OFF}$. Further, to lower the power consumption of the back light source 64, which is one of the components of the display, for the purpose of conserving the power consumption of the overall system, it is necessary to enhance transmittance of each pixel. On the other hand, in case the liquid crystal matrix display is applied to an information terminal device with so many pixels such as a CAD or CG display or a HDTV, the liquid crystal device has difficulty in meeting the foregoing necessary conditions of the liquid crystal panel.

The embodiment shown in FIG. 5 is arranged to meet the foregoing necessary conditions for realizing a high-quality liquid crystal color display.

As the concrete means for the purpose, the opaque materials 51, 52, 59 are provided for screening light from the area uncontrolled by the display electrode 54.

To expand the description more concretely, as shown in FIG. 5A, the display electrode 54 and the opaque materials 51, 52 are overlapped under the condition of $W_2>0$ and $W_1 \geq 0$ ($W_1+W_2=W_B$) and the end of the opaque material 59 formed on the other substrate 62 is located off the light-uncontrolled area of the substrate 61 so as to keep a constant distance ($=W_B$) therebetween.

The opaque material 59 located near the points 53A to 53D where the upper and the lower ends of the opaque materials 51 and 52 are crossed with the display electrode 54 is formed in a manner to depict a fan with a radius of about $W_B$. By defining the dimension of the opaque material 51, it is possible to prevent the leakage of the light applied from the backlight source even if the fitting between both of the substrates 61 and 62 is slipped vertically and horizontally, resulting in implementing a high-contrast display.

$W_1$ is equal to or more than the slippage caused in forming the display electrode 54 and the opaque materials 51, 52 and $W_B(=W_1+W_2)$ is set to such a value as disallowing the light applied from the backlight source 64 to be visually seen from the vertically or horizontally oblique point of view.

Figure 7:
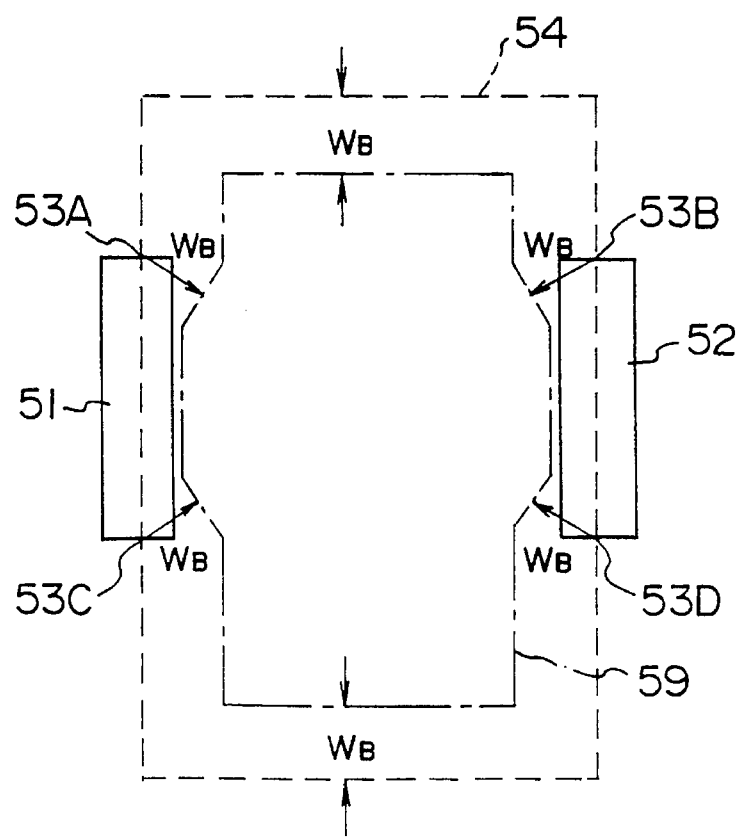
FIG. 7 is a schematic view showing another embodiment of each pixel included in a liquid crystal panel.

FIG. 7 shows another embodiment of the present invention. In the embodiment, the distance between the points 53A to 53D and the end of the opaque material 59 is set as $\geq W_B$. It results in making the end of the opaque material 59 linear, thereby improving the working accuracy.

The opaque material formed on the substrate 61, though it is not illustrative, may be in the same layer or another layer if the condition shown in FIG. 5A ($W_1 \geq 0$ and $W_2>0$) is met. Nothing specifies the location of the opaque material.

Further, nothing specifies the number and the form of the opaque material as well.

Assuming that the width of minimizing $W_B(=W_1+W_2)$ is $W_B(min)$ in the opaque material meeting the condition shown in FIG. 5A ($W_1 \geq 0$ and $W_2>0$), the distance between the area uncontrolled by light on the substrate 61 and the end of the opaque material 59 formed on the other substrate 62 may be set to be equal to or more than the $W_B(min)$.

Figure 8:
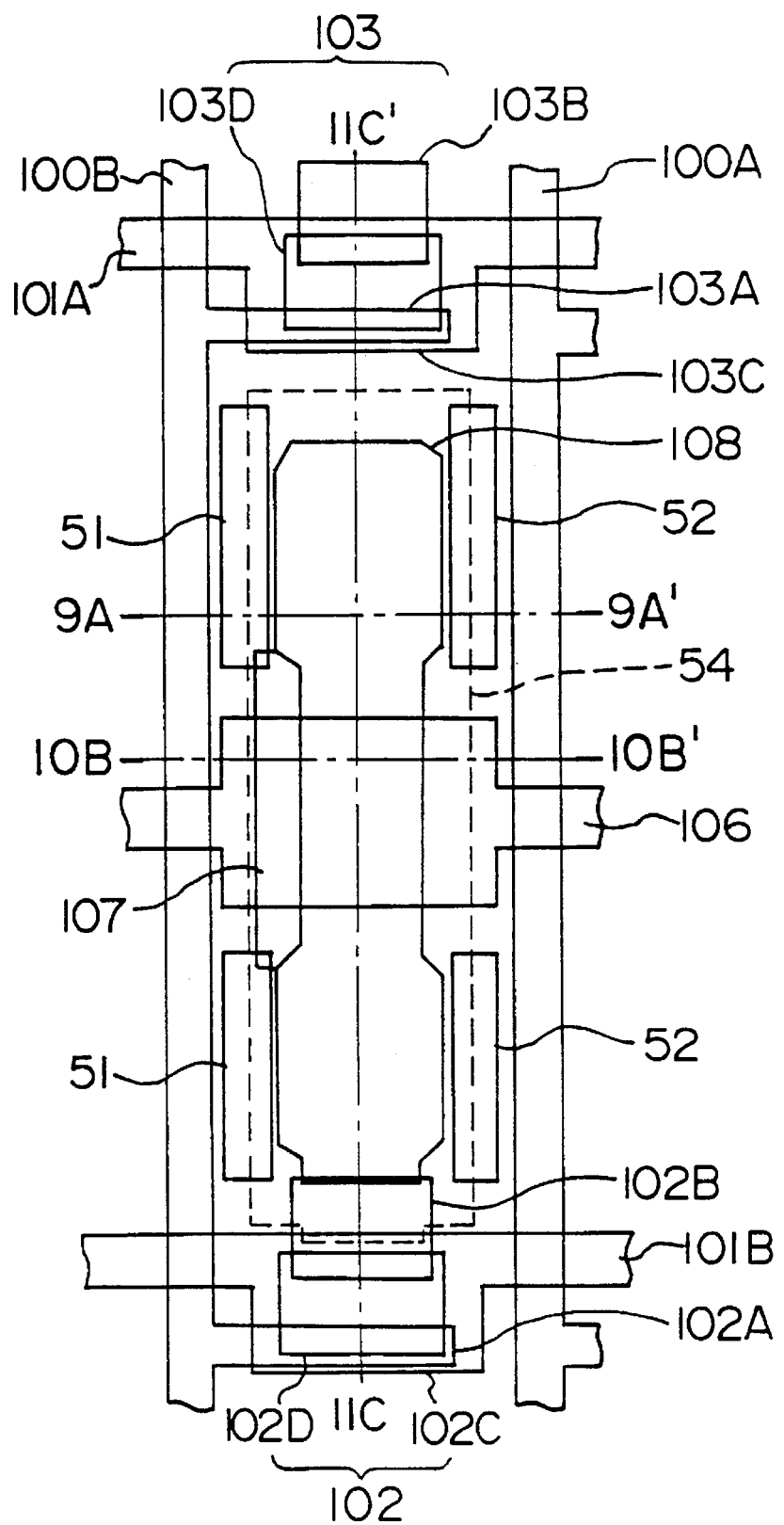
FIG. 8 is a view showing another embodiment of a liquid crystal panel according to the present invention.

FIG. 8 shows a liquid crystal panel according to another embodiment of the present invention. 102 denotes a transistor composed of a drain electrode 102A, a source electrode 102B, a gate electrode 102C, and a semiconductor layer 102D. 103 denotes another transistor composed of a drain electrode 103A, a source electrode 103B, a gate electrode 103C, and a semiconductor layer 103D. The semiconductor layers 102D, 103D are preferably an a-Si type thin film transistor and a p-Si type thin film transistor. However, nothing specifies those semiconductor layers 102D and 103D.

100A and 100B denote signal lines. The signal lines 100A and 100B are electrically connected to drain electrodes 102A and 103A of the thin film transistors 102 and 103 so that a voltage for controlling the brightness of the liquid crystal is applied to the signal lines 100A and 100B. 101A and 101B denote scan lines to which a voltage for switching the thin film transistors 102 and 103 on and off is applied.

The display electrode 54 is a transparent electrode made of ITO (Indium Tix Oxide) and is electrically connected to a source electrode 102B. 51 and 52 denote opaque materials, which are preferably made of opaque metal such as Cr or Al. Any material may be used for the opaque materials 51, 52 if it has a characteristic of screening a visible ray of light.

106 denotes a storage capacitance line which is partially overlapped with the display electrode 54. The overlapped portion corresponds to the storage capacitance element 310. 107 denotes a short-circuit electrode of the display electrode 54. The short-circuit electrode 107 serves to prevent electric separation of the display electrode 54 in the vertical manner when the display electrode 54 gets over the display electrode 54.

The foregoing components are formed on one substrate. The other substrate having a color filter formed thereon is located in opposition to the substrate. Both of the substrates keep a distance of about 10 µm. The liquid crystal is sealed between both of the substrates.

Figure 9:
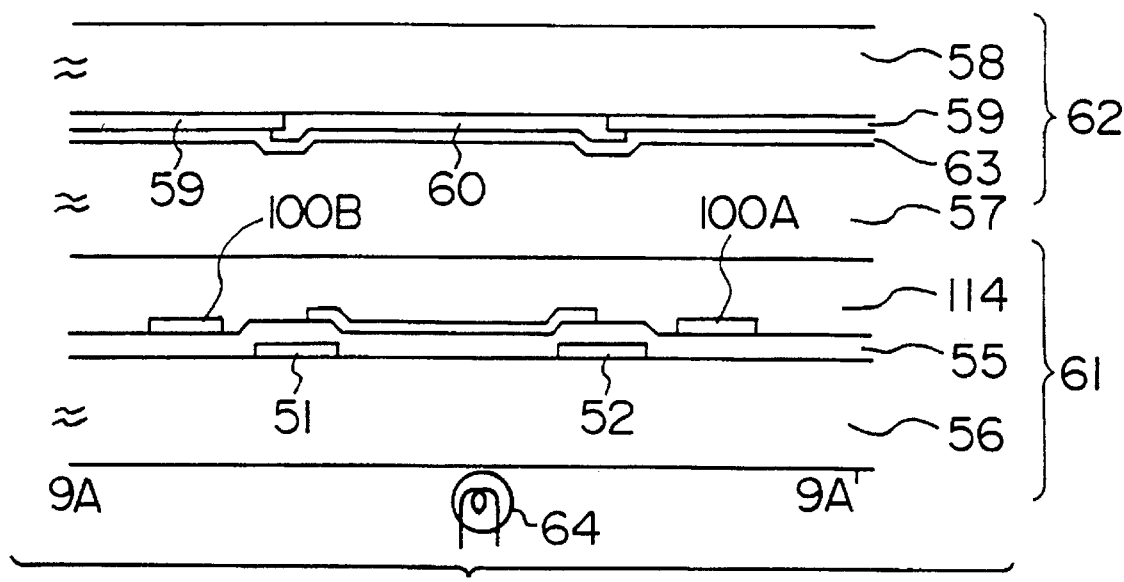
FIG. 9 is a section view of the embodiment shown in FIG. 8 on the line A–A' of FIG. 8.
Figure 10:
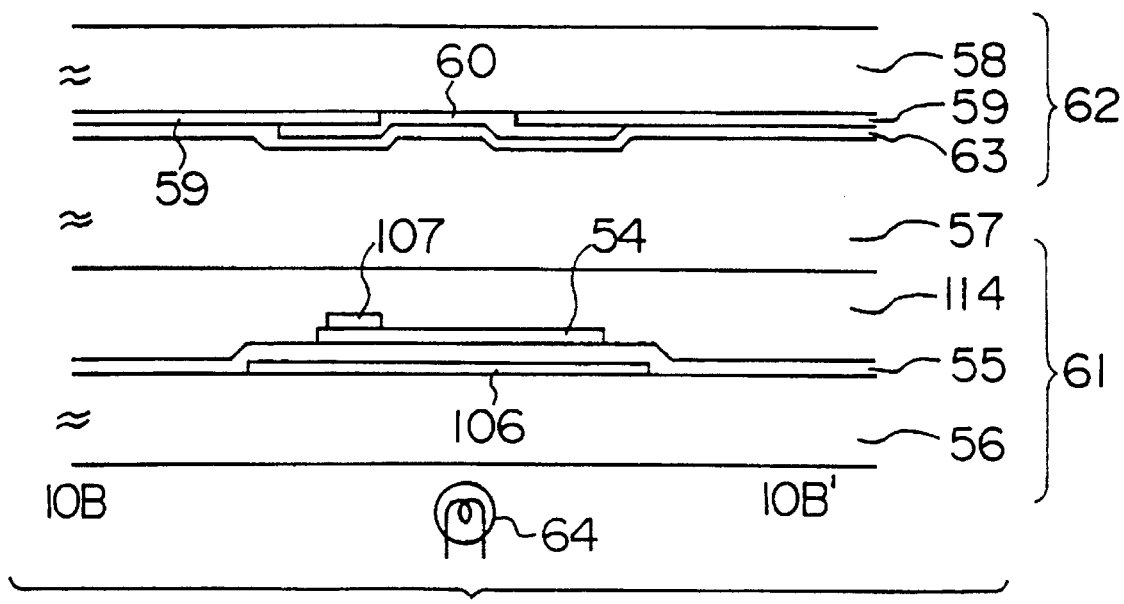
FIG. 10 is a section view of the embodiment shown in FIG. 8 on the line B–B' of FIG. 8.
Figure 11:
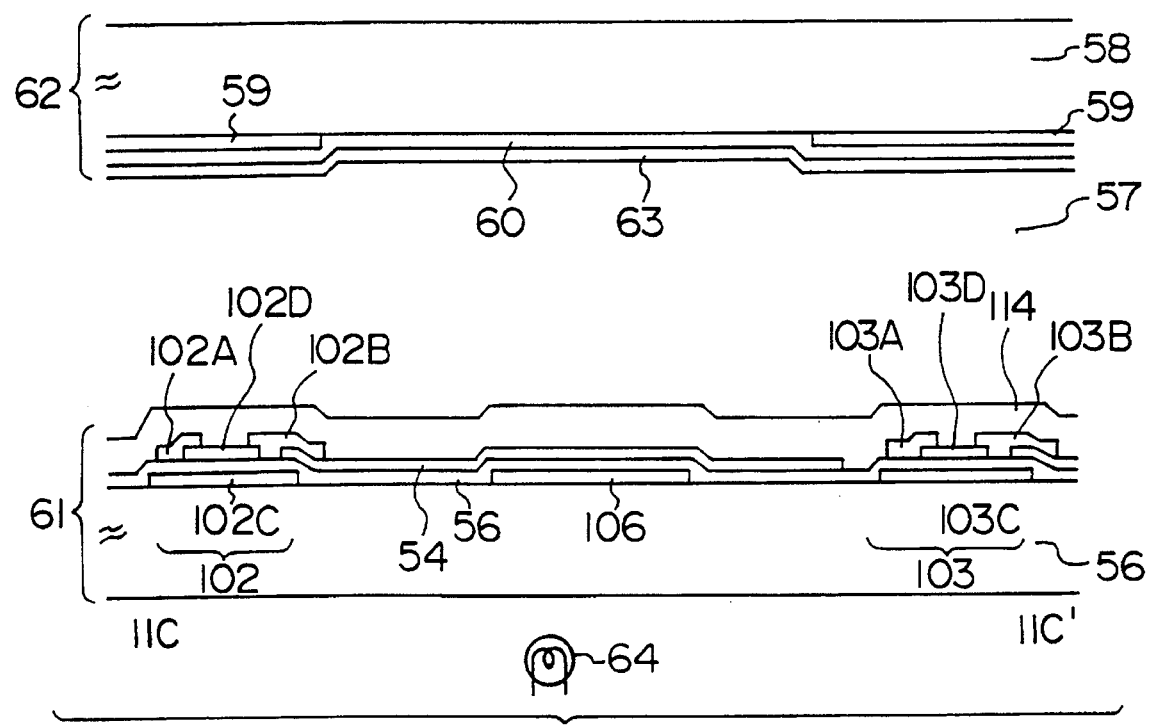
FIG. 11 is a section view of the embodiment shown in FIG. 8 on the line C–C' of FIG. 8.

FIGS. 9, 10 and 11 show sectional structure of the liquid crystal panel shown in FIG. 8 on the 9A–9A', the 10B–10B' and the 11C–11C'. The same components shown in FIGS. 8 to 11 are referenced by the same numbers.

In FIG. 9, 56 denotes a transparent substrate made of glass, for example. 114 and 55 denote insulating layers formed by SiNx, for example. 57 denotes a liquid crystal. 58 denotes a transparent substrate (the other substrate) made of glass, for example, 59 denotes an opaque material made of opaque metal or an organic material containing black pigment, 60 denotes a R, G and B color filter, and 63 denotes a common electrode formed by a transparent material such as ITO.

Figure 12:
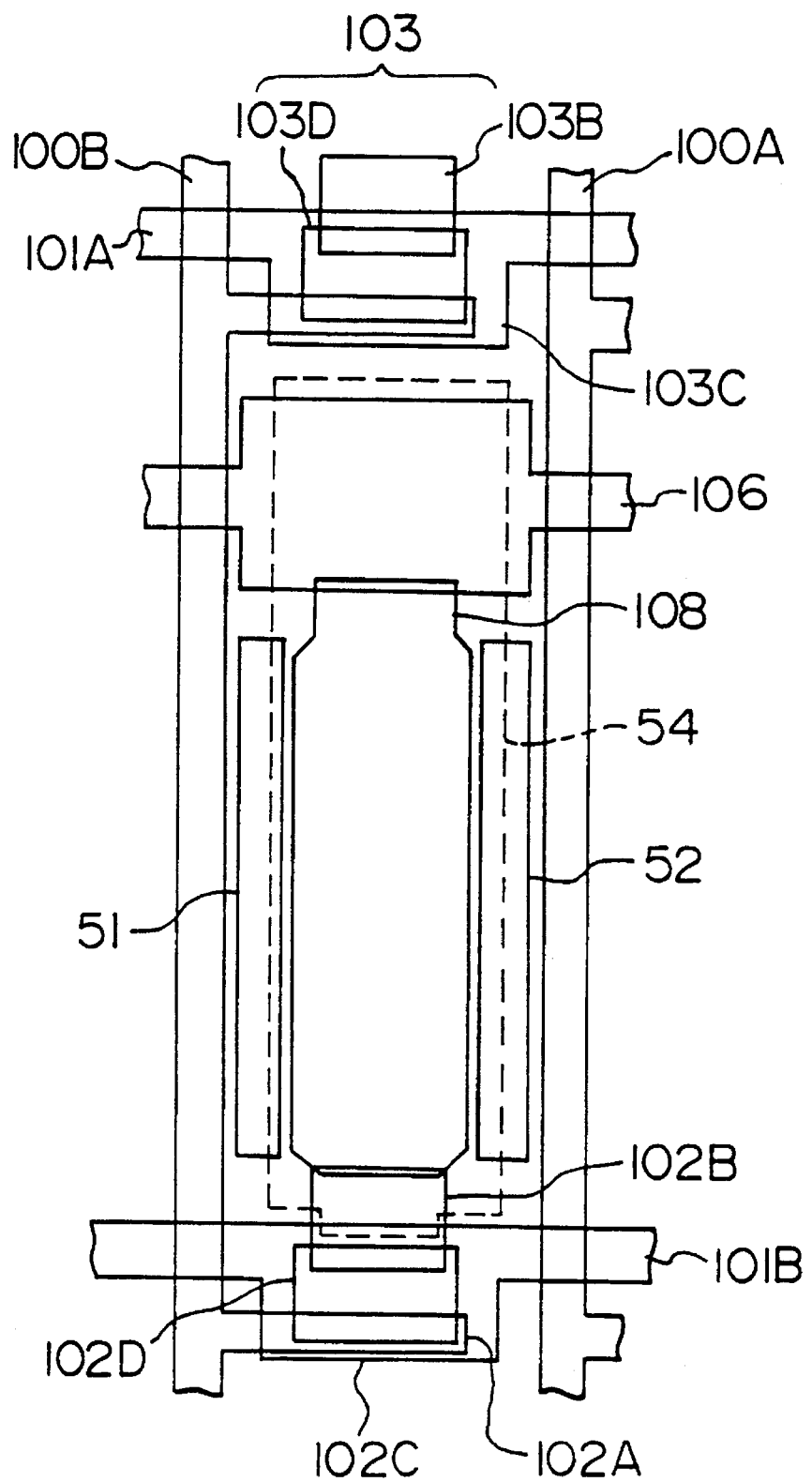
FIG. 12 is a view showing a liquid crystal panel according to another embodiment of the present invention.
Figure 13:
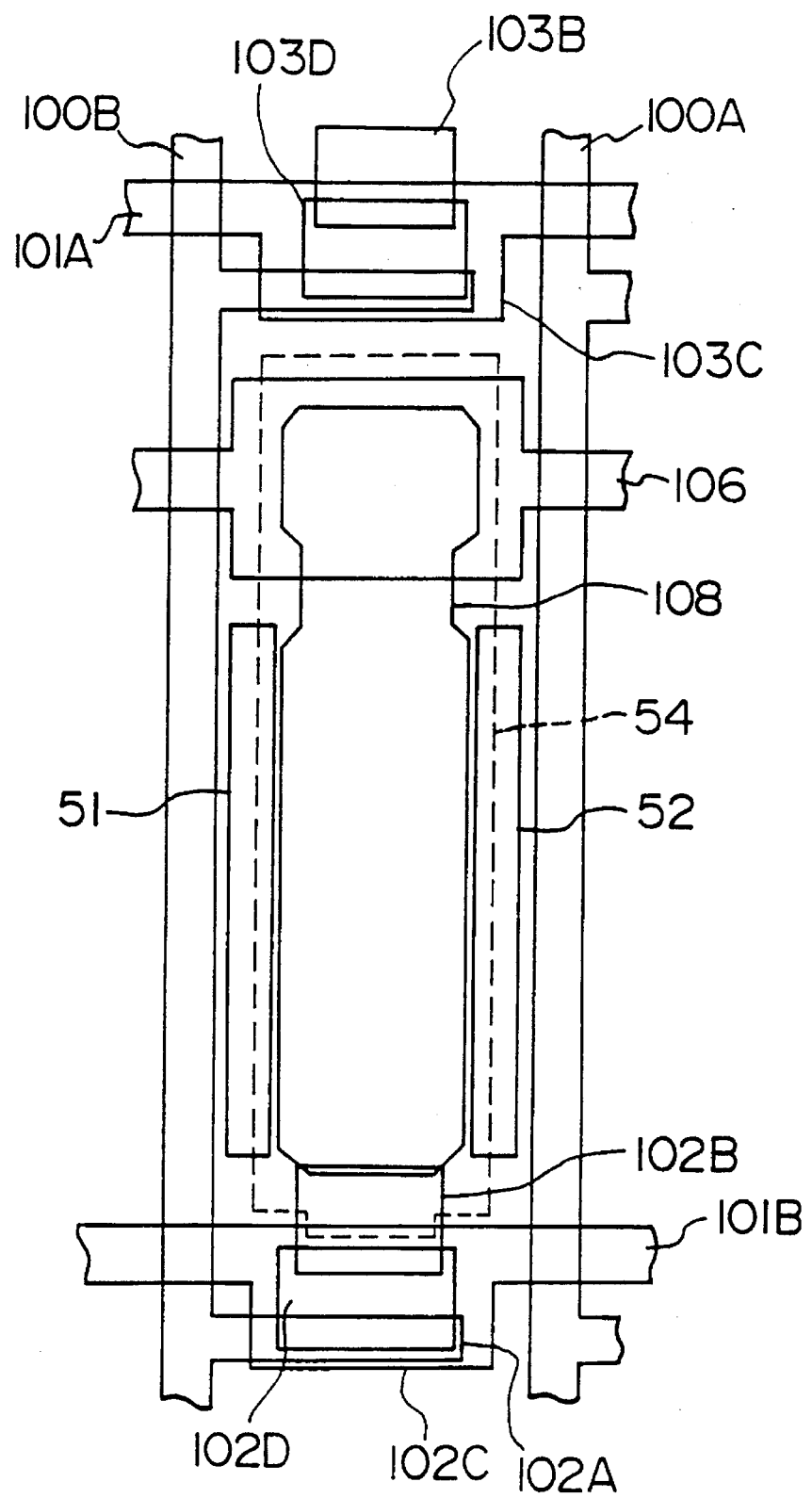
FIG. 13 is a view showing a liquid crystal panel according to another embodiment of the present invention.

As shown in the sectional views of FIGS. 9 to 11, the gate electrodes 102C, 103C, the opaque materials 51, 52 and the storage capacitance line 106 are formed on the same layer. Another embodiment of the present invention will be shown in FIGS. 12 to 14. FIGS. 12 and 13 show the embodiment where the storage capacitance line 106 is shifted to the thin film transistor 103. This embodiment makes it possible to provide an excellent display without dividing each pixel into two parts.

Figure 14:
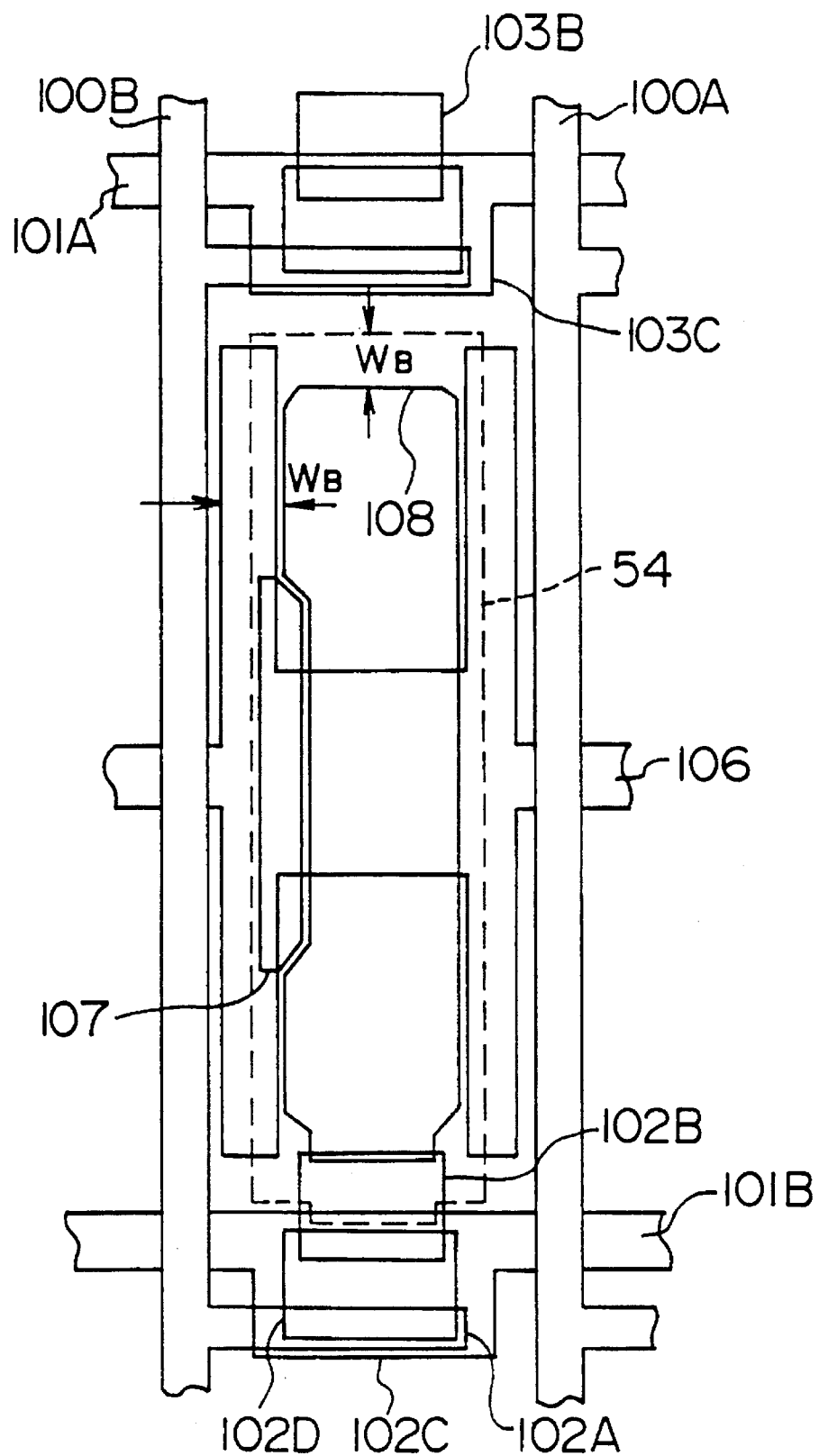
FIG. 14 is a view showing a liquid crystal panel according to another embodiment of the present invention.

FIG. 14 shows the embodiment where the storage capacitance line 106 is formed integrally with the opaque material so as to increase the storage capacitance. This embodiment thus makes it possible to provide a high-quality display with no unevenness.

Figure 15A:
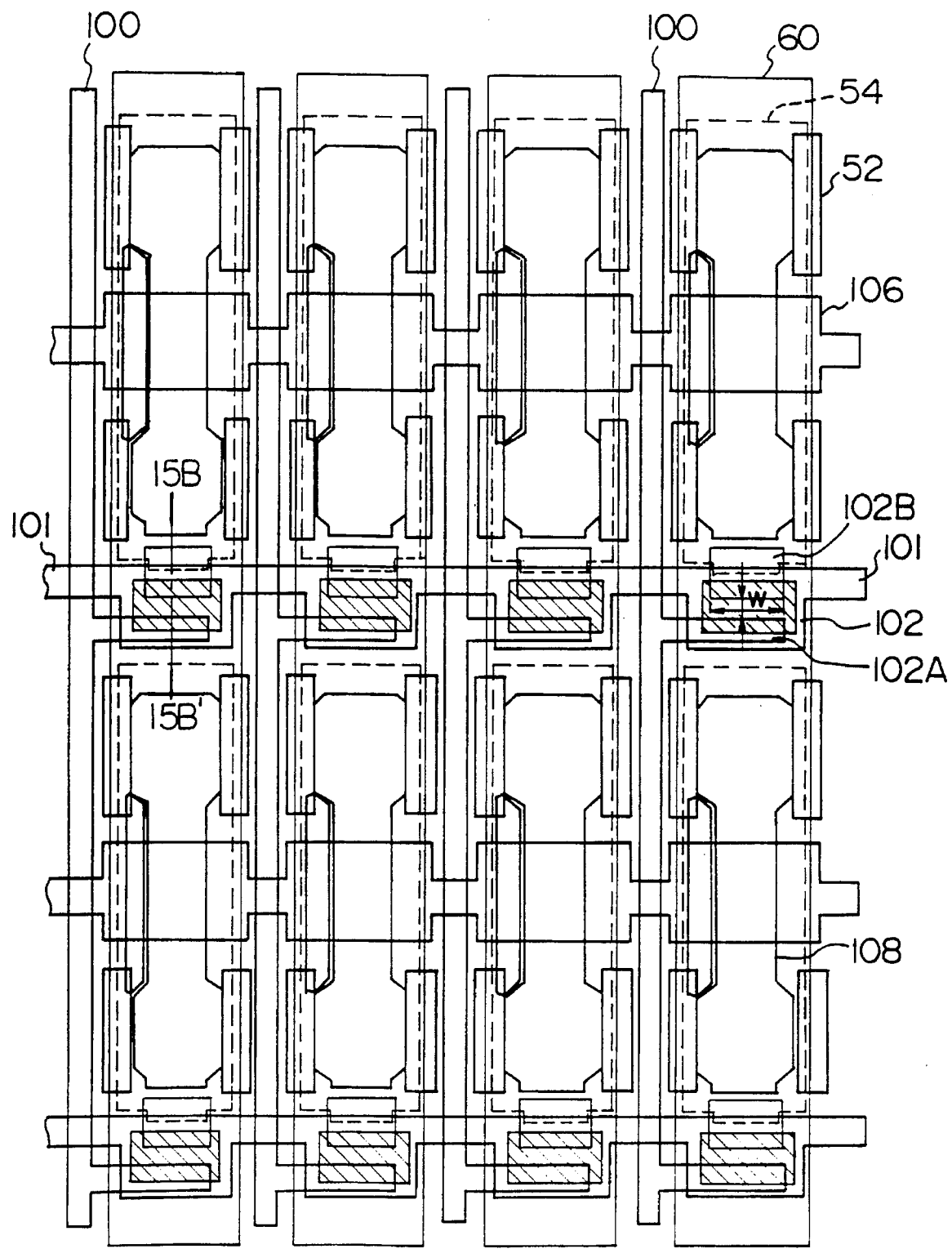
FIGS. 15A and 15B are views showing a liquid crystal display unit included in the liquid display device according to the present invention.
Figure 15B:
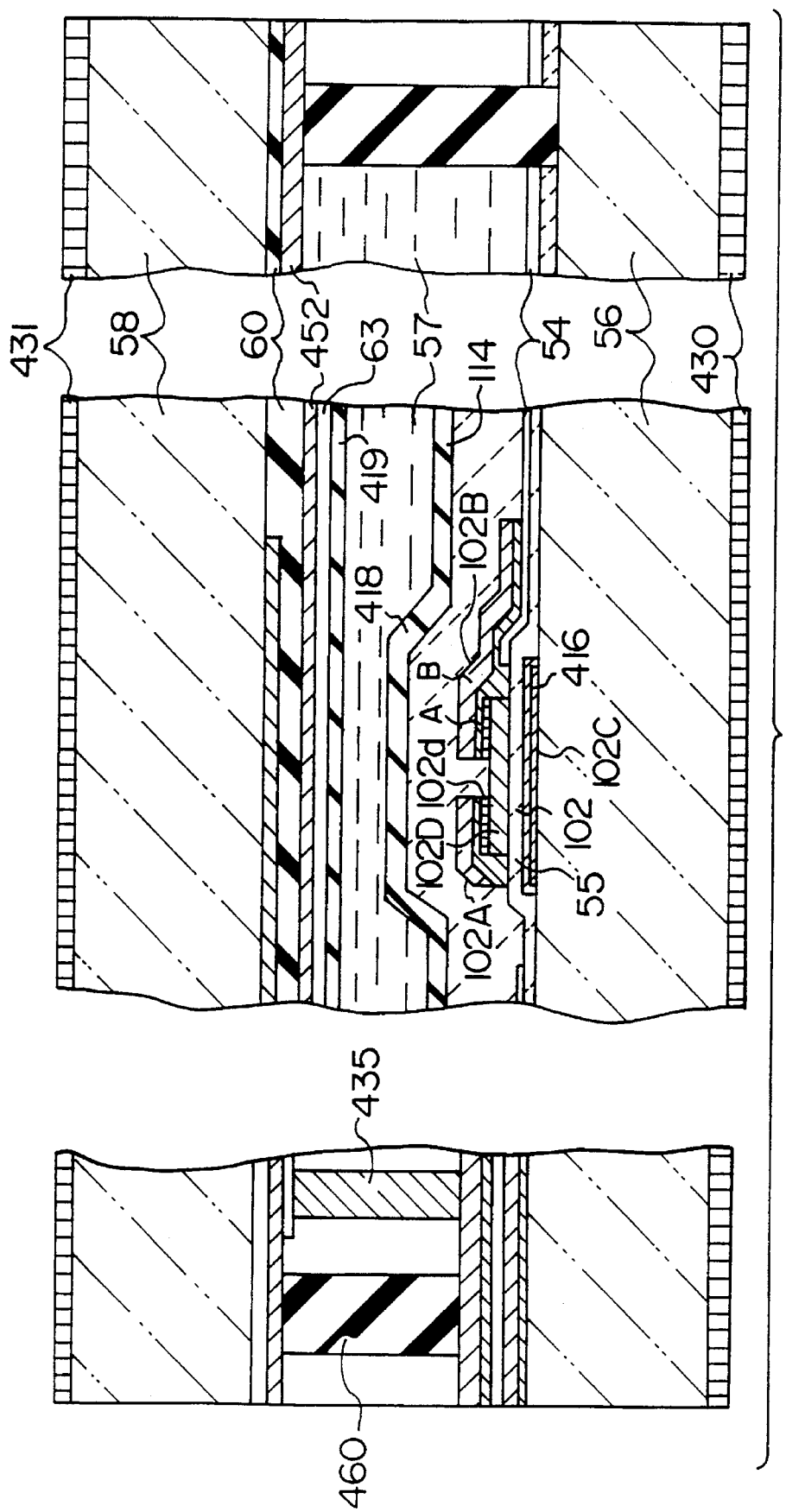

In turn, FIG. 15A shows a liquid crystal display section included in an active matrix color liquid crystal display device. FIG. 15B is a sectional view of the 15BB–15BB' of FIG. 15A. FIG. 15B shows the structure containing the liquid crystal device as well. FIG. 16 is a plan view showing part of a pixel for describing the manufacturing process. In FIG. 15B, one pixel included in the liquid crystal section is composed of the thin film transistor 102 and the display electrode 54 formed on the lower transparent glass base 56, which has a thickness of about 1.1 mm, for example. The thin film transistor 102 contained in each pixel is arranged to mainly have a gate electrode 102c, a gate insulating film 55, an i-type (no conductive impurity is doped) noncrystalline silicon semiconductor 102D, and a pair of source electrode 102B and drain electrode 102A. Each pixel is located within a crossing area of the adjacent two scan lines 101 and the adjacent two signal lines 100. Two or more scan lines 101 extend in a column direction and range in a row direction. Two or more signal lines 100 extend in a row direction and range in a column direction.

In turn, the description will be directed to the manufacturing process of the liquid crystal panel.

The liquid crystal 57 is sealed within the space formed between the lower transparent glass substrate 56 and the upper transparent glass substrate 58 as being defined by a lower orientation film 418 and an upper orientation film 419 which serve to define the molecular orientation of the liquid crystal. The lower orientation film 418 is formed on a protective film 114 made of silicon nitride which is formed on the lower transparent glass substrate 56. The upper transparent glass substrate includes a color filter 60, an organic protective film 452, a common electrode 63, and an upper orientation film 419 laminated on the inside thereof in the describing sequence. The common electrode 63 is opposed to the display electrode 54 included in each pixel on the side of the lower transparent glass substrate 56 and is formed integrally with the upper transparent glass substrate 58. FIG. 15A is a plan view showing the overlap of the pixel with the color filter shown in FIG. 16, in which a common voltage $V_{com}$ is applied to the common electrode 63.

The color filter 60 includes a dye carrier formed of a resin material such as acrylic resin. The color filter 60 is located in opposition to each pixel and between the adjacent two display signal lines 100 in a manner to bridge between the pixels. For each pixel, the corresponding color filter 60 is colored. This color filter 60 is formed in accordance with the following process. At first, a dye material is formed on the surface of the upper transparent glass substrate 58. All the dye carrier except the red filter area is removed by a photolithograph technique. Then, the dye carrier is colored with a red dye and the fixing process is carried out so as to fix the red dye on the dye carrier. Likewise, the green filter and the blue filter are formed. The organic protective film 452 is provided to prevent the dye materials colored to the color filter 60 from being leaked into the liquid crystal. The organic protective film 452 is formed of a transparent resin material such as acrylic resin or epoxy resin.

The lower transparent glass substrate 56 and the upper transparent glass substrate 58 are independently formed as described above. Then, both of the glass substrates 56 and 58 are combined with the liquid crystal being sealed therebetween, resulting in completing the liquid crystal display device.

The central portion shown in FIG. 15B shows one pixel in section. The left portion shows the section of the portion where an external pull-out wire exists in the left side edge portions of the transparent glass substrates 56 and 58. The right portion shows the section of the portion where no external pull-out wire exists in the right side edge portions of the transparent glass substrates 56 and 58.

460 denotes a sealing member which is shown in the right and the left sides shown in FIG. 15B. The sealing member 460 is formed on the peripheral edges of the transparent glass substrates 56 and 58 so as to allow the liquid crystal 57 to be sealed within the space defined by the both transparent glass substrates and the sealing member 460. This sealing member 460 may be made of epoxy resin, for example.

The common electrode 63 of the upper transparent glass substrate 58 is, at least at one portion, connected to an external pull-out wire formed on the lower transparent glass substrate 56 by means of a silver paste 435. With respect to the gate electrode 102C, the source electrode 102B and the drain electrode 102A, the external pul-out wire is formed by the same manufacturing process.

The orientation films 418, 419, the display electrode 54 and the common electrode 63 are formed inside of the sealing member 460. 430 and 431 denote polarizing plates, which are respectively formed on the outside surfaces of the lower transparent glass substrate 400 and the upper transparent glass substrate 58.

The gate electrode 102C is formed of an aluminium film and has a film thickness of about 100 nm. The gate electrode 102C is formed to be large enough to completely cover the silicon semiconductor layer 102D (if viewed from the lower side). In case, hence, a backlight source like a fluorescent lamp is mounted on the lower side of the lower transparent glass substrate 56, that opaque gate electrode 102C serves as an obstacle to the light applied from the backlight source. Hence, the light is prevented from being hit on the silicon semiconductor layer 102D. It results in lowering a possibility that a conduction phenomenon due to the light emission, that is, the off characteristic degradation of the thin film transistor 102 takes place.

Considering the gate electrode 102C in light of the function of the gate and the light screening, the gate electrode 102C and its wire may be integrally formed on a single layer. In this case, it is possible to select aluminium containing silicon, pure aluminium, or aluminium containing palladium as an opaque conductive material.

The gate insulating film 55 of the thin film transistor 102 is formed on the gate electrode 102C and the upper layer of the scan line 101. The gate insulating film 55 is made from silicon nitride film by means of the plasma CVD method, for example. The thickness of the gate insulating film 55 is about 300 nm. As another gate insulating film, there is provided an alumina gate insulating film 416 formed by transforming the aluminium film of the gate electrode into alumina by means of the anodizing method, for example. That is, the gate insulating film has the dual-film structure. This alumina gate insulating film 416 serves as preventing the short-circuit between the gate electrode 102C and the wiring portion formed on the upper layer such as a metal film used for the scan line 101 and the drain electrode 102A and the source electrode 102B.

52 denotes a light-screening film formed in the same process as the terminal portion formed for pulling the scan line 102 out. This light-screening film 52 is formed by a sputtering method and is subject to patterning by means of the photolithography technique. The silicon type semiconductor layer 102D is formed of an amorphous silicon film or a multi-layered silicon film and has a thickness of about 180 nm. This silicon semiconductor layer 102D can be formed as changing the components of a supply gas in the plasma CVD apparatus when the silicon nitride gate insulating film 55 is formed. Besides, it is formed without being exposed to the outside of the apparatus. An N+ layer 102d with a dopant of phosphorus for ohmic contact can be formed in the same process so as to have a thickness of about 40 nm. Then, the resulting lower transparent glass substrate 56 is pulled out of the plasma CVD apparatus and the silicon semiconductor layer 102D is patterned in an insular manner by means of the photolithography technique.

Next, the display electrode 54 is made of a transparent conductive film (ITO) formed by the sputtering method so as to have a film thickness of 120 to 200 nm. Then, the display electrode 54 is patterned at each pixel by means of the photolithography technique.

The source electrode 102B and the drain electrode 102A are respectively composed by laminating a first conductive film A and a second conductive film B on the lower surfaces of those electrodes 102B and 102A which are in contact with the N+ semiconductor layer 102d. The first conductive film A contained in the source electrode 102B and the drain electrode 102A uses a chrome film formed by the sputtering method and has a thickness of 50 to 100 nm. As the chrome film is made thicker than a given thickness, the stress caused in the chrome film becomes larger. Hence, it is necessary to define the thickness of the chrome film to be 200 nm or less. The chrome film keeps in good contact with the N+ semiconductor layer 102d so that the chrome film can prevent diffusion of aluminium contained in the second conductive film B (to be described later) to the N+ semiconductor layer 102d, that is, the chrome film serves as a barrier layer. The first conductive film may be formed of a high melting point metal film (Mo, Ti, Ta, W) and a high melting point metal silicide ($MoSi_2$, $TiSi_2$, $TaSi_2$, $WSi_2$) in addition to chrome. The second conductive film B is formed of aluminium to have a thickness of 300 to 400 nm by means of the sputtering method. Since the aluminium film has smaller stress than the chrome film, the thicker aluminium film than the chrome film can be formed so as to diminish the resistance values of the source electrode 102B, the drain electrode 102A and the signal line 100. The second conductive film B is arranged to enhance an operating speed and a signal transmission speed of a display signal of the thin film transistor 102. That is, the second conductive film B enhances a writing characteristic of the pixel. To form the second conductive film B, it is also possible to use an aluminium film containing silicon (Si) or copper (Cu) as an additive. The source electrode 102B and the drain electrode 102A composed of the first conductive film A and the second conductive film B are respectively patterned by means of the photolithography technique. The N+ semiconductor layer 102d is partially removed with the masks of the photolithomask, the first conductive film A and the second conductive film B. That is, the N+ semiconductor layer 102d left on the silicon semiconductor layer 102D are removed except the portions having the first and the second conductive films A and B.

FIG. 16 is a plan view showing the manufacturing process from the start to the foregoing steps.

Then, the silicon nitride is formed on the lower transparent glass substrate 56 to have a thickness of 1 μm by means of the plasma CVD method. With the photolithography technique, the essential portions such as a terminal portion are exposed from the silicon nitride film and then a silicon nitride film 114 is covered on the overall pixel for protecting the pixel.

Figure 17:
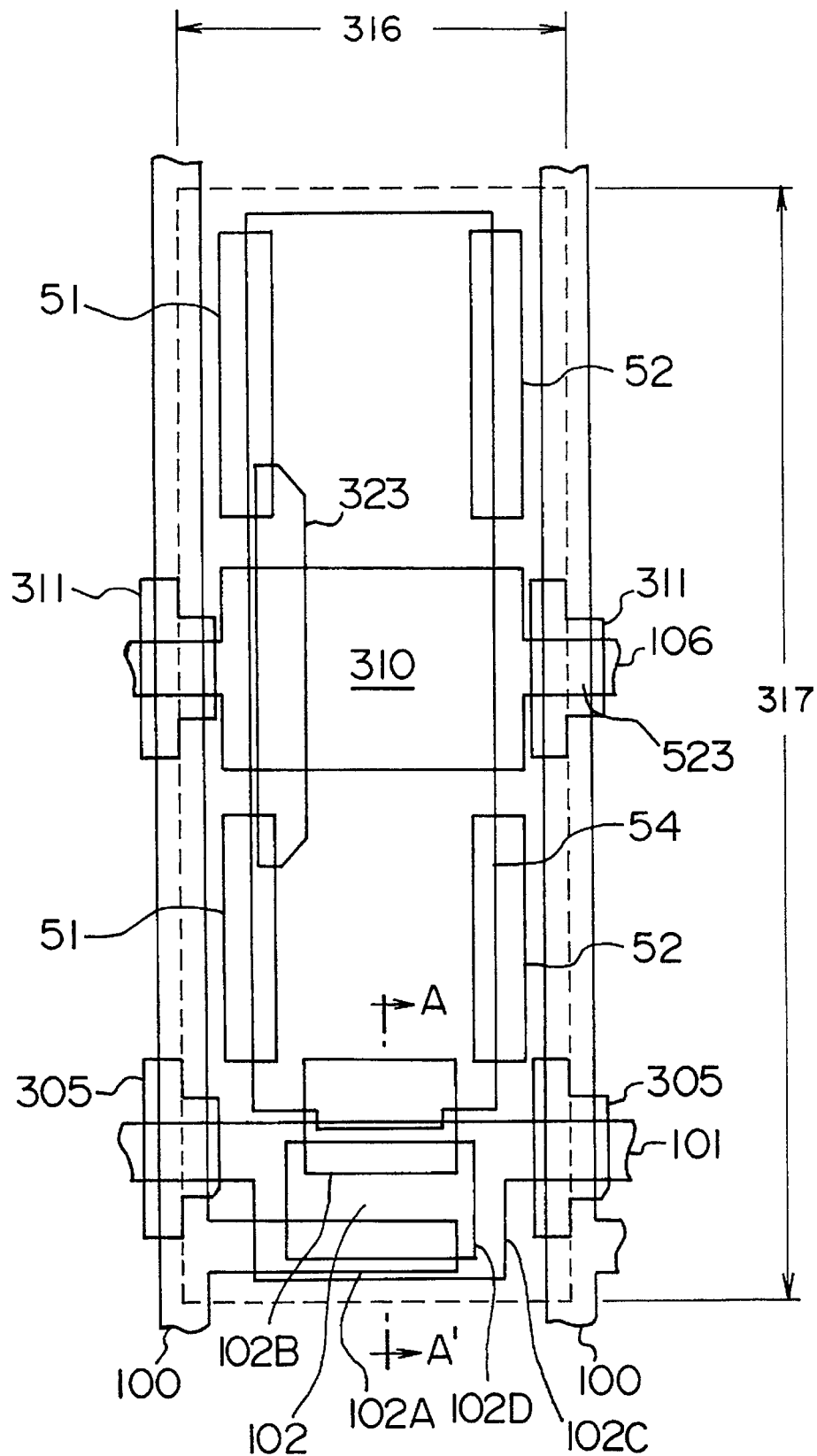
FIG. 17 is a view showing one pixel included in the liquid crystal display unit of the liquid crystal display device according to the present invention.
Figure 18:
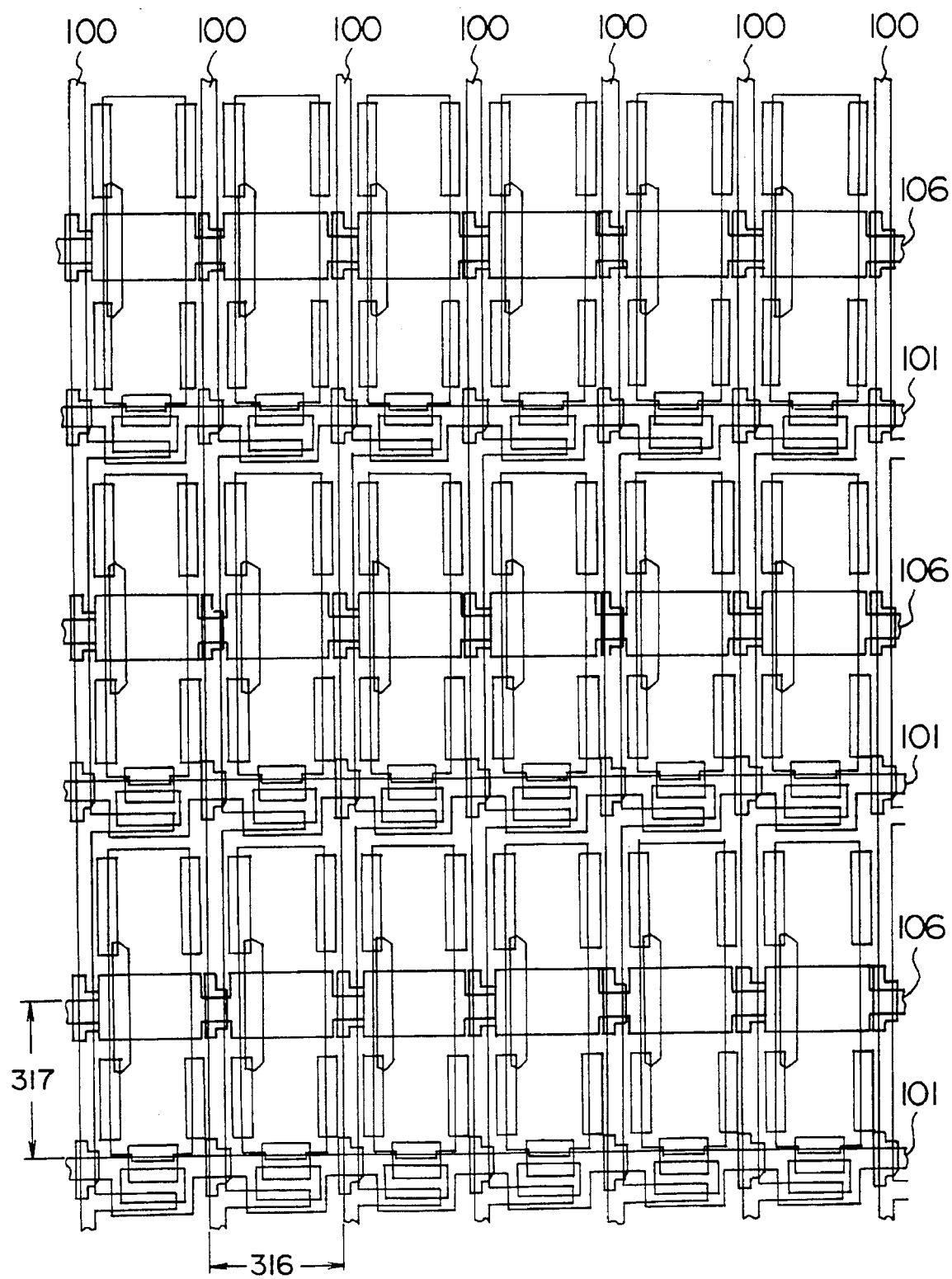
FIG. 18 is a view showing an essential portion of the liquid crystal display unit of the liquid crystal display device according to the present invention.

FIG. 17 shows one pixel of a liquid display portion included in the active matrix liquid crystal display device according to the embodiment of the present invention and FIG. 18 shows an essential portion of the liquid crystal display portion having two or more pixels located therein.

The scan lines 101 extend in the row direction and range in the column direction. The signal line 100 extends in the column direction and ranges in the row direction. The storage capacitance lines 106 extend between the adjacent scan lines 101 in the row direction in parallel to the scan lines 101 and range in the column direction.

Those signal lines are connected to the corresponding driving circuits located around the liquid crystal display portion. That is, each scan line 101 is connected to the terminal portion formed on the transparent glass substrate at the tip end of the scan line 101 extended in the row direction, for example, the left end of the scan line 101. Each terminal portion is connected to a TAB within which each terminal portion is connected to each output portion of the signal driving circuits. The storage capacitance line 106 is connected to a common electrode at the tip end of the storage capacitance line 106 extended in the row direction, for example, the right end of the storage capacitance line 106 and then to the terminal portion. The terminal portion is connected to an electrode formed on an FPC which leads to the output portion of the storage capacitance driving voltage generating circuit 205.

As shown in FIG. 17, the thin film transistor 102 contained in each pixel is arranged to mainly have a gate electrode (scan line) 102C, an insulating film, a noncrystalline silicon semiconductor 102D, and a pair of source electrode 102B and drain electrode 102A. It is to be understood that the definition of the electrodes as the source and the drain depends on the bias polarity and the definition is switched depending on the reverse operation of the polarity. The following description is, however, expanded on the assumption that the source electrode and the drain electrode are fixed for easier understanding of the present invention. In the pixel, the thin film transistor 102 is located on the scan line 101 located under the pixel. This scan line 101 serves as a gate electrode of the thin film transistor 102. The channel direction (direction of the current flowing between the source and the drain) of the thin film transistor 102 is located in parallel to the direction of the signal line 100. The end portion of the thin film transistor 102 is connected to the display electrode 54. The drain electrode 102A is located under the thin film transistor 102 and is connected to the signal line 100 located on the left side of the pixel. In the present embodiment, hence, the pixel is controlled by the scan line 101 located under the pixel and the signal line 100 located on the left side of the pixel itself. Further, this embodiment assumes the factor W/L defining mutual conductance gm, that is, a ratio of a channel length L (distance between the source and the drain electrodes) to a channel width W of the thin film transistor 102 as about 3. This value is defined in light of dimensional shift in working in addition to a frame frequency, the number of scan lines, movability of a thin film transistor, a liquid crystal capacitance value, a storage capacitance value, and so forth.

The storage capacitance line 106 is located between the adjacent scan signal lines 101. The substantially uniform interval is kept between the storage capacitance line 106 and the scan line 101. The square display electrode 54 is located within the area defined by the adjacent two scan lines 101 and the adjacent two signal lines 100 and the storage capacitance element 310 is formed at the cross point of the storage capacitance line 106 and the display electrode 54. The storage capacitance element 310 provides a capacitance value per one pixel defined depending on the W/L of the thin film transistor 102, the overlapping capacitance (Cgs) between the source electrode 102B and the scan line 101, and so forth. The area of the storage capacitance element 310 is defined depending on the capacitance value per a unit area of the insulating film. In the present embodiment, the storage capacitance element 310 is rectangular. The vertical length (as viewed in the vertical direction of FIG. 17) is defined on the fact that the horizontal length is equal to the length of the display electrode.

A get-over electrode 323 is provided on the display electrode 54. The get-over electrode 323 is formed in the layer where the source and the drain electrodes are formed and serves to electrically connect the overlapped portion of the display electrode 54 with the storage capacitance line 106 to the other portion of the display electrode 54. It results in making it possible to prevent display failure due to disconnection of the display electrode 54 at a step portion of the storage capacitance line 106. The liquid crystal element is formed on the portion where the display electrode 54 is not overlapped with the storage capacitance line 106.

At the cross points between the signal line 100 and the scan line 101 and between the signal line 100 and the storage capacitance line 106, noncrystalline silicon semiconductors 305 and 311 are respectively provided. Those semiconductors 305 and 311 are formed on the layer where the noncrystalline silicon semiconductor 102D of thin film transistor 102 is formed.

The display electrode 54 occupies a maximum area unless the short-circuit takes place between the display electrode 54 and the display signal line 100, the noncrystalline silicon semiconductors 305, 311, the drain electrode 102A, or the like. The display electrode 54 provides the light-screening layers 51, 52 at the end portions thereof so as to partially prevent light from being leaked from the periphery of the display electrode 54. The display electrode 54 is at the same potential as the source electrode 201B. Hence, writing the potential of the display signal line 100 in the display electrode 54 and holding the potential of the display electrode 54 are controlled depending on switching the thin film transistor 102 on or off.

The pixels, each arranged as shown in FIG. 17, are ranged in the row direction and the column direction at each pitch of a horizontal dimension 316 and a vertical dimensional 317 as shown in FIG. 18. The upper transparent glass substrate is provided in opposition to the lower transparent glass substrate formed as shown in FIG. 18.

Figure 19:
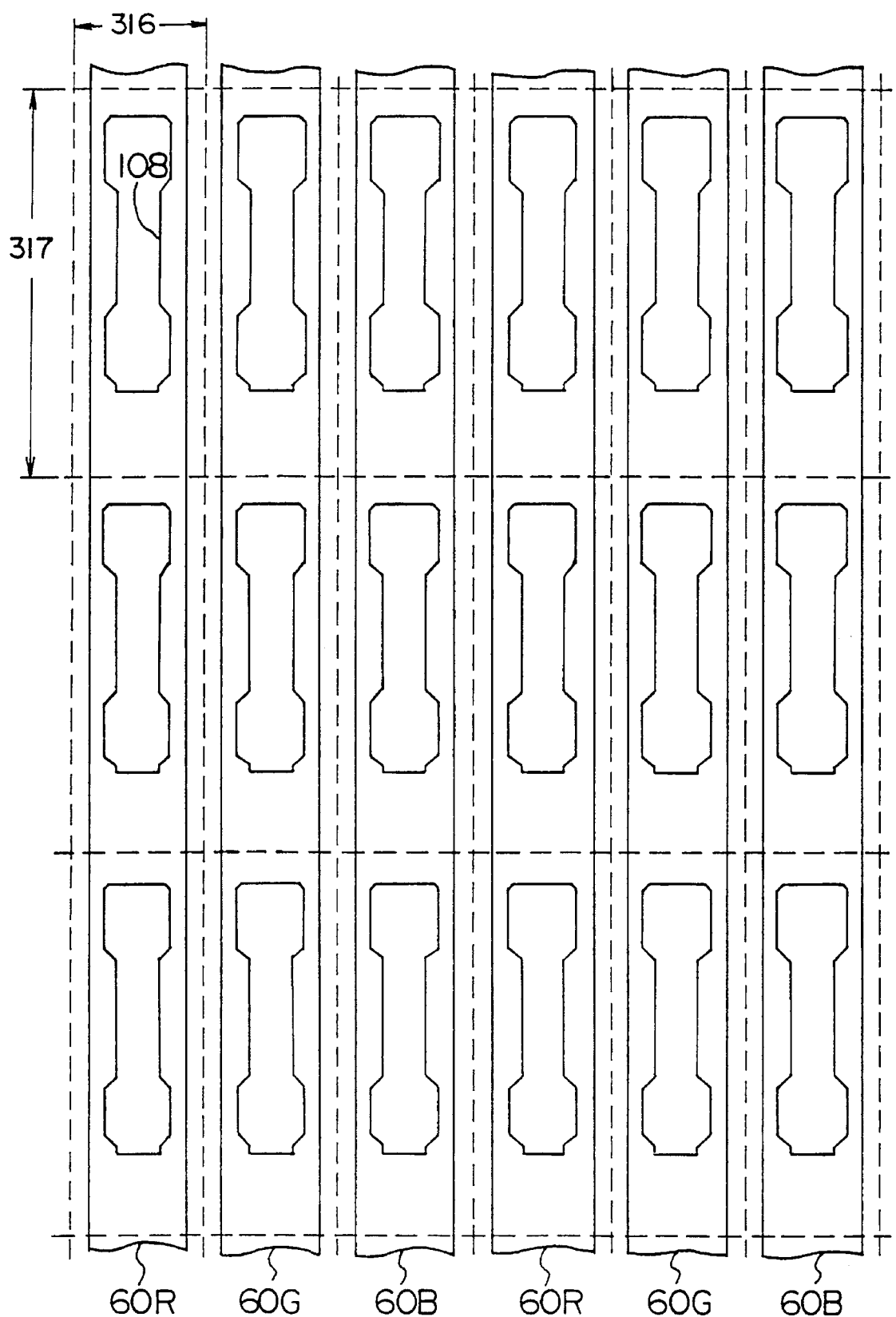
FIG. 19 is a view showing a color filter pattern included in the liquid crystal display unit according to the present invention.

FIG. 19 shows a color filter pattern provided on the upper transparent glass substrate where two or more pixels are located. In FIG. 19, each pixel frame with the horizontal dimension 316 and the vertical dimension 317 is shown by a broken line for clarifying the position relation between the pixel pattern on the lower transparent glass substrate and the color filter pattern. FIG. 19 is a plan view of the color filter pattern viewed from the back surface of the upper transparent glass substrate (the opposite side to the liquid-crystal side). As will be clearly appreciated from FIG. 19, the color filter is arranged so as to correspond to each pixel and colored. That is, like the pixel, the color filter is formed on the area where the adjacent two scan lines are crossed with the adjacent two signal lines. On the surface of the inside (liquid-crystal side) of the upper transparent glass substrate, several patterns are formed including a light-screening layer 108, a red filter layer (R) 60R, a green filter layer (G) 60G, and a blue filter layer (B) 60B. And, the common electrode 63 covers on the overall surface of the liquid crystal display portion. Those patterns extend in the column direction and range in the row direction in the sequence of red, green and blue. It means that the filter color is unique along each pattern column. That is, the color filter has the structure where vertical stripes are located.

Figure 20:
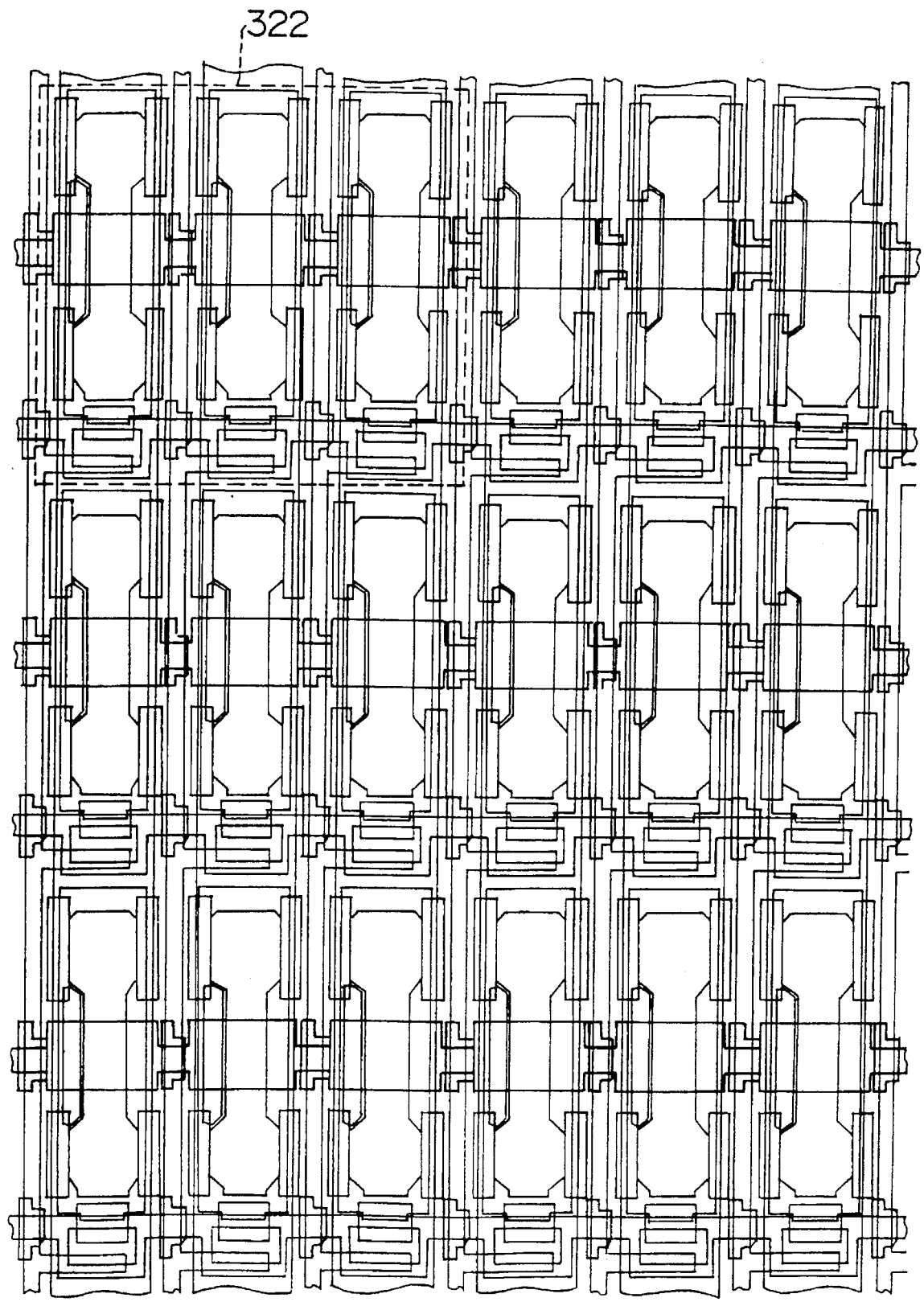
FIG. 20 is a view showing a pixel pattern and a color filter pattern included in the liquid crystal display unit.

FIG. 20 shows the pixel patterns formed on the lower transparent glass substrate and the color filter patterns formed on the upper transparent glass substrate at the same time. In the liquid crystal display device according to the present invention, the mixture of the R, G and B pixels ranged in parallel results in realizing multi-color display. It means three pixels ranged horizontally compose one display unit (1 dot) 322. The vertical dimension of each dot is set substantially equal to the horizontal dimension. Hence, the horizontal dimension 316 of one pixel is set to be ⅓ time as large as the vertical dimension 317 thereof.

The desired number of dots arranged as above compose the liquid crystal display section. On the back surface (opposite side to the liquid crystal) of the lower transparent glass substrate of the liquid crystal display section, there is provided a light source (backlight). A voltage (an effective value of an a.c.voltage) is kept between the transparent pixel electrodes of the pixels formed on the lower transparent glass substrate and the common transparent electrodes formed on the upper transparent glass substrate. The voltage is applied to the liquid crystal sealed between the upper and the lower glass substrates so as to change the molecular orientation of the liquid crystal, thereby to change the light transmittance of the light applied from the backlight source. This change results in realizing the display. To enhance the definition of the liquid crystal display device, the dimension of one dot is set smaller. By setting the dimension of one dot to be 0.2 mm or some, for example, the liquid crystal display device can provide high definition.

In turn, the description will be directed to the arrangement of the storage capacitance element and the driving method therefor. At first, some embodiments will be described about the storage capacitance element which is suitable to reducing variation of the optimal common potential on the same plane.

Figure 21:
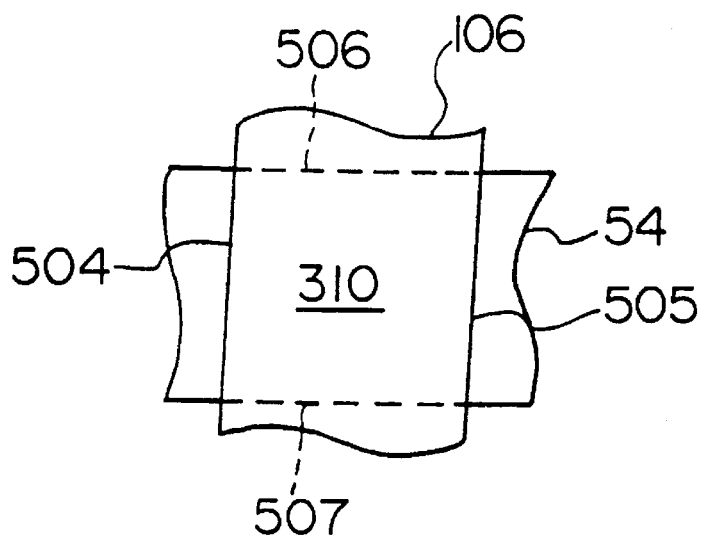
FIG. 21 is a view showing an embodiment of a storage capacitance element included in the present invention.

FIG. 21 shows an embodiment for describing the storage capacitance element used in this invention. The storage capacitance element is composed of a crossing portion 310 between the first electrode 106 made of a storage capacitance line and a second electrode 54 being a display electrode opposed to the first electrode 106 through the insulating layer. The storage capacitance element 310 includes an upper end 506 and a lower end (as viewed in FIG. 21) both terminated at the end portions of the first electrode 106 and a left end 504 and a right end 505 both terminated at the end portions of the second electrode 54.

$$L<1.33S/D \qquad (1)$$

The expression (1) features the arrangement of the storage capacitance element 310. In the expression (1), L denotes a total length (μm) of sides 504, 505, 506, 507 of the capacitance portion, S denotes an area (μm$^2$) of the crossing portion 310, that is, the storage capacitance element, and D denotes a diagonal length (inch) of an area in the display section where the pixels are located. The area variation of the capacitance portion caused when the element dimensions are variable on the display surface is denoted by LΔX. ΔX denotes a slippage, that is, a variation (μm) of an average dimension of the worked elements. ΔX is normally proportional to D, though ΔX depends on the working technique. Hence, ΔX=aD is established. According to an experiment implemented by the inventors, the proportional constant a is about 0.15. Thus, $$\Delta X=0.15D \qquad (2)$$

In the 10-inch display device which is often available as a display terminal for OA equipment, ΔX is about 1.5 μm. A rate of the area of the storage capacitance element to the capacitance portion caused when the dimensions are variable on the plane, that is, a rate of variation of a capacitance value is denoted by LΔX/S.

The voltage applied on the display electrode 54 depends on the change of the scan voltage.

Figure 34A:
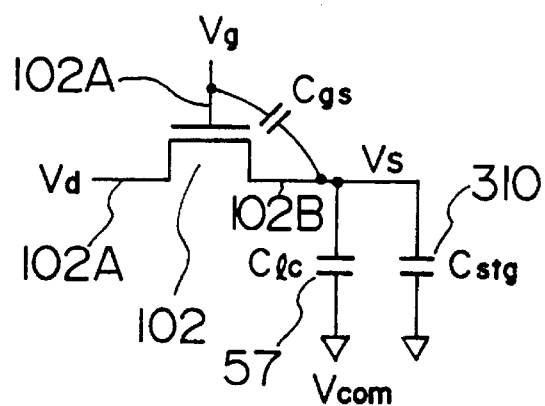
FIGS. 34A and 34B are views showing how a voltage changes on a display electrode.
Figure 34B:
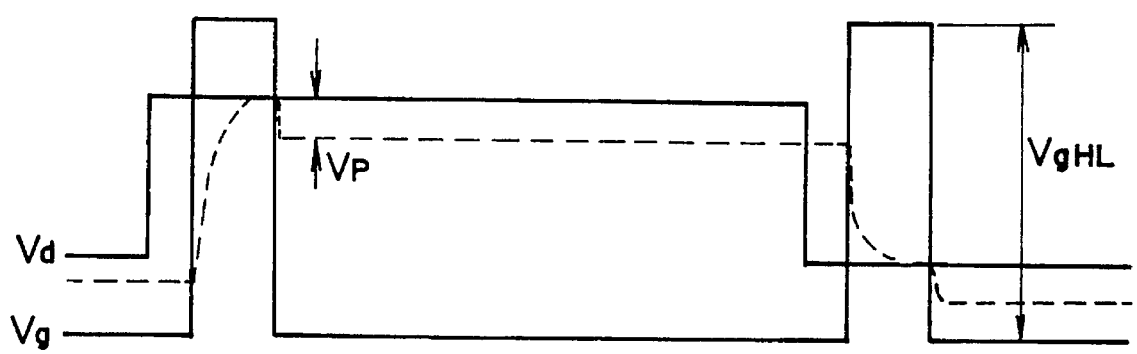

FIG. 34B shows how the display electrode 54 is changed. The voltage of the display electrode is made equal to the signal voltage for switching the thin film on. Then, when the scan voltage Vg shifts into a low potential, the thin film transistor is switched off. At a time, the source voltage Vs drops by Vp when the scan voltage Vg rises.

To prevent degradation of a characteristic of the liquid crystal 57 and of a response time of the image display, it is preferable that the d.c.components of the voltage caused between the voltage of the source electrode 102B and the common potential Vcom are reduced to 0 V.

Depending on the drop of the source voltage Vx, the common potential is required to drop. The common potential at this time is referred to as an optimal common potential. The change of the source voltage Vs due to the scan voltage Vg is referred to as a coupling voltage Vp.

Figure 22:
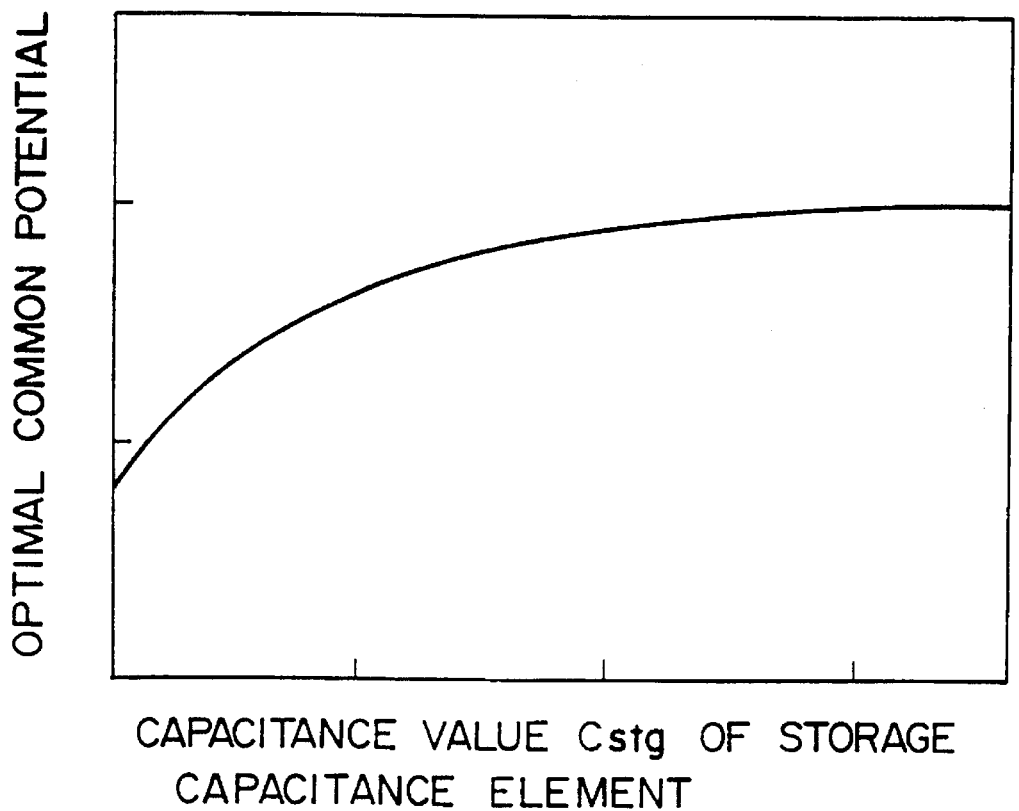
FIG. 22 is a graph showing relation between a capacitance value of the storage capacitance element and an optimal common electric potential.

FIG. 22 shows the relation between the capacitance value of the storage capacitance element and the optimal common potential. The curve shown in FIG. 22 is true to any pixel used in the normally available liquid crystal display in addition to the present invention. Assuming that the storage capacitance is Cstg, the parasitic capacitance between the source and the gate of the thin film transistor is Cgs, the liquid crystal capacitance is Clc, and the potential difference between when the scan line (gate) is on and when it is off is VgHL, the coupling voltage can be represented as follows.

$$Vp=Cgs/(Cgs+Cstg+Clc)\cdot VgHL \qquad (3)$$

When the capacitance value Cstg of the storage capacitance element is small, the coupling voltage Vp becomes larger based on the equation (3), resulting in lowering the optimal common potential. The present inventors have found out from the dependency of the optimal common potential on the capacitance value of the storage capacitance element that the variation of the optimal common potential can be suppressed to be 200 mV or lower independently of the capacitance value if the ratio of the variation of the capacitance value is about 20% or less. Hence, if the equation of $$L\Delta X/S<0.2 \qquad (4)$$

is established, no failure takes place such as an after image or degradation of liquid crystal. The equation (1) can be obtained from the equations (2) and (4).

Figure 23:
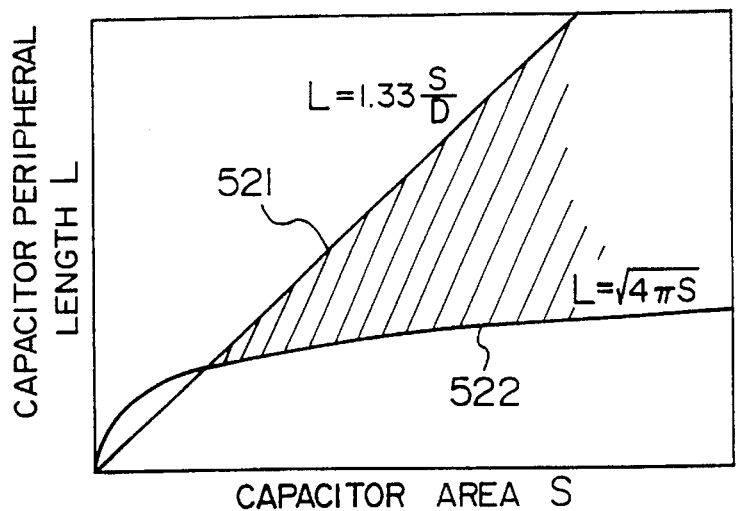
FIG. 23 is a graph showing relation between an area of a capacitance unit included in the storage capacitance element and a peripheral length of the capacitance unit.

FIG. 23 shows the relation between the capacitance portion area S and the peripheral length L of the capacitance portion. The curve 522 shows a circular capacitance portion, that is, a minimum peripheral length L of the capacitance portion. The peripheral length L of the capacitance portion corresponds to the area located above the curve 522. The line 521 shows the equation (1) in which the sign of inequality is replaced with a sign of equality. The equation (1) indicates the peripheral length of the capacitance portion corresponds to the area located above the line 521. That is, the oblique-line area enclosed by the curve 522 and the line 521 corresponds to an area in which there exist such peripheral lengths of the capacitance portion as suppressing the variation of the optimum common potential to be 200 mV or less. As will be appreciated from the equation (1), as the diagnosis line D of the display portion is made longer, the line 521 has a smaller gradient, resulting in narrowing the oblique-line area. As will be appreciated from FIG. 28, as the area of the capacitance portion is made smaller, the oblique-line area is made narrower. That is, as the liquid crystal display device provides a larger screen and as the area of the capacitance portion is made smaller because the screen is reduced in size as a result of making the liquid crystal display device more definitive, the peripheral length of the capacitance portion has a smaller allowance area. It results in putting the significance on the form and the dimension of the storage capacitance element. The present invention becomes significant in case the diagnosis length of the display portion contained in the liquid crystal display device is 9 inch or more, the diagnosis length of one dot (one display unit consisting of three pixels R, G and B) is 400 μm or less or the area of one pixel is 30000 μm$^2$ or less.

According to the curve shown in FIG. 22, it is considered that as the storage capacitance element provides a larger capacitance value, the variation of the optimum common potential is made smaller when the capacitance value changes and the variation of the optimum common potential is suppressed to be 200 mV or less even if the variation rate of the capacitance value is about 20% or more. However, herein, it is necessary to vary the optimum common potential depending on the signal potential of the signal line. That is, if the storage capacitance element provides too small capacitance, the optimum common potential varies greatly depending on the signal potential, because the difference between jump voltages based on the potentials appearing on the signal wire is too conspicuous. For example, if a small voltage is applied to the liquid crystal capacitance, the jump voltage becomes larger than that if a larger voltage is applied, thereby making the optimum common potential smaller. Hence, a d.c.voltage is applied on the other in-plane location where another signal potential is applied except the in-plane location where the optimum common potential is properly adjusted. It results in bringing about some failures such as an after image and degradation of liquid crystal. If the storage capacitance element provides too large capacitance, the degree of the writing based on the potential of an image signal line greatly changes. Conversely, if a large voltage is applied to the liquid crystal capacitance, the writing ratio is made lower on a positive polarity side than the writing ratio if a small voltage is applied. It results in varying the optimum common potential and bringing about some failures such as an after image or degradation of the liquid crystal like the above. It is, therefore, necessary to set the capacitance value of the storage capacitance element to a proper value. In actual, it is effective that the capacitance value of the storage capacitance element is three to seven times as large as the capacitance value of the liquid crystal.

Returning to FIG. 17, the description will be directed to the storage capacitance element 310. In FIG. 17, one electrode (storage capacitance line) 106 of the storage capacitance element 310 is substantially perpendicular to the other electrode (display electrode) 54 and the storage capacitance element 310 is substantially rectangular. The electrode 106 of the storage capacitance element 310 is made of a low-resistance metal such as Al. The electrode 106 composes the common electrode portion and is located in parallel to the gate electrode (scan signal line) 101. The display electrode 54 of the storage capacitance element 310 is a pixel electrode which is a transparent conductive film made from indium tin oxide (ITO), for example. The display electrode 54 includes a light-transmitting area formed outside of the storage capacitance line 106 through the insulating film. This area becomes an opening portion. Between the storage capacitance line 106 and the display electrode 54 is laminated an insulating film made of a silicon nitride film or a compound film consisting of a silicon nitride film and an $Al_2O_3$ film formed by anodizing Al. Such a film is used in another embodiment. The horizontal width of the display electrode 54 is designed to have the largest length unless it short-circuits with the adjacent display signal line 100. Hence, since the storage capacitance element is rectangular, the vertical width of the storage capacitance line 106 at the location corresponding to the storage capacitance element is made minimum with respect to the set area of the storage capacitance element. At the crossing portion 523 of the storage capacitance line 106 and the signal line 100, the crossing area is designed to be as small as possible, because the short-circuit between the storage capacitance line 106 and the signal line 100 is likely to take place. Hence, the width of the storage capacitance line 106 on the crossing portion 523 is designed to be normally finer than the line width on the capacitance portion 310. In order to reduce a probability of occurrence of short-circuit, on the crossing portion 523, an amorphous silicon layer 311 is located between the storage capacitance line 106 and the signal line 100. The get-over electrode 323 is intended to connect the display electrode 54 located over the step formed at the end portion of the storage capacitance line 106 in order to avoid the disconnection of the display electrode 54 resulting from the step difference. In the embodiment, the relation between an area and a length of the storage capacitance element 310 meets the relation of the equation (1). It results in reducing variation of the capacitance resulting from the dimensional variation of the elements and thereby bringing about no failure such as an after image or degradation of liquid crystal. Further, since the storage capacitance element portion of the storage capacitance line 106 is arranged to have a minimum vertical width, it is possible to keep a sufficiently long interval between the storage capacitance line 106 and the scan line 101 forming a gate electrode located in parallel. It means that there is even a small possibility of occurrence of the short-circuit between the scan line 101 and the storage capacitance line 106. As will be appreciated from FIG. 17, the upper and lower ends of the storage capacitance element are terminated at the electrodes and the right and left ends thereof are terminated at the other electrodes. Further, both of the electrodes keep the width constant within the distance from the end portion of the crossing portion between the two electrodes to the slipping portion of the electrodes. The slippage hence does not change the area of the crossing portion, that is, the capacitance portion. As a result, since no variation of the capacitance value of the storage capacitance element is brought about based on the slippage from the proper position, no excessive d.c. voltage is partially applied to the liquid crystal provided on the screen, resulting in bringing about no failure such as an after image or degradation of the liquid crystal.

Figure 24:
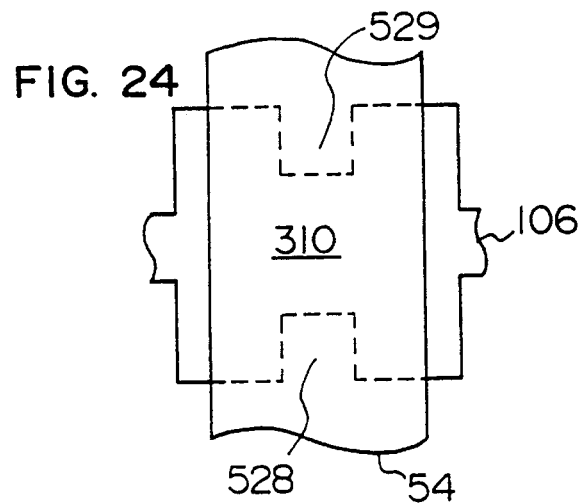
FIG. 24 is a view showing another embodiment of the storage capacitance element unit included in the present invention.

FIG. 24 shows another embodiment of the present invention. As shown, the illustration is limited to the storage capacitance line 106 and the display electrode 54 composing the storage capacitance element 310. According to the present embodiment, the relation between an area and a peripheral length of the storage capacitance element 310 meets the equation (1). Those electrodes keep their widths constant within the distance from the crossing portion of the storage capacitance element 106 and the display electrode 54 to the slipped portion between at least the two layers. Hence, the variation of a capacitance value resulting from the dimensional variation is quite small. Since the storage capacitance element does not bring about any variation of the capacitance value resulting from the slippage from the proper position, no failure takes place such as an after image or degradation of the liquid crystal. Further, in the present embodiment, the storage capacitance line 106 does not provide linear upper and lower ends, the end surfaces of which are directed into at least three directions. Since the storage capacitance line 106 provides step portions directed in at least three ways, the display electrode 54 can be sufficiently fitted to the storage capacitance line 106 at any one of the step portions directed in the three ways and the fitting is strong enough to prevent the disconnection. The concave portions 528 and 529 provided in the storage capacitance element 310 may be convex portions. Further, those concave portions have no limitation in their positions, size and form. In case the relation between the area and the peripheral length meets the equation used in the description of FIG. 21 and the upper and the lower ends are directed into at least three ways, the effect of this embodiment is true to the construction.

Figure 25:
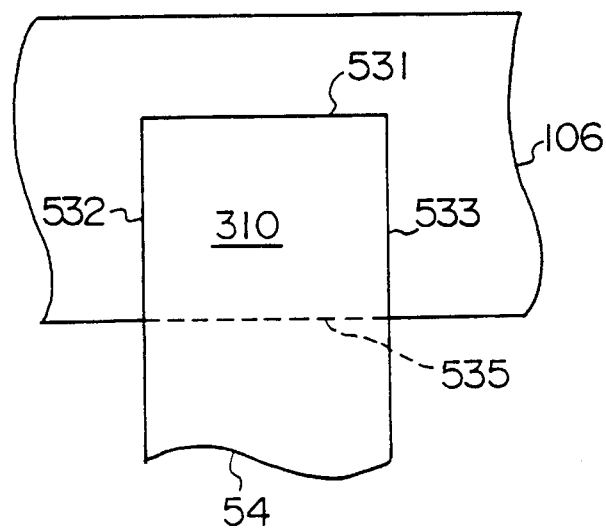
FIG. 25 is a view showing another embodiment of the storage capacitance element.

FIG. 25 shows another embodiment of the present invention. As shown, the storage capacitance element 310 provides an upper end 531 and a right and a left ends 532, 533 terminated at the display electrode 54. In this embodiment, the relation between an area and a peripheral length of the storage capacitance element 310 meets the equation used in the description of FIG. 21. Hence, the variation of a capacitance value resulting from the dimensional variation is very small and no failure is brought about such as an after image and degradation of the liquid crystal. Since the display electrode 54 is terminated at the upper end 531, the display portion is located only under the storage capacitance element 310. The arrangement where the storage capacitance element 310 does not disconnect the display portion therefore makes it possible to avoid lowering a resolution. Since the display electrode 54 gets over the step of the storage capacitance line 106 at one portion, the disconnection of the display electrode 54 is unlikely to take place. This embodiment is also effective in case of the additional capacitance element whose electrode is a gate electrode at the front step.

The reduction of an after image or degradation of the liquid crystal described in the foregoing embodiments can be achieved by the other method. That is, the parasitic capacitance Cgs between the gate and the source is 5% or less of a sum of the storage capacitance Cstg and the liquid crystal capacitance Clc. This setting makes it possible to reduce the coupling voltage and the dependency of the optimal common potential on the capacitance value of the storage capacitance element. Hence, it is not necessary to provide the constraint shown in FIG. 21 to the form of the storage capacitance element.

Then, the description will be directed to a driving method for a storage capacitance element which is suitable to reduction of the variation of the optimal common potential or the threshold value.

Figure 26:
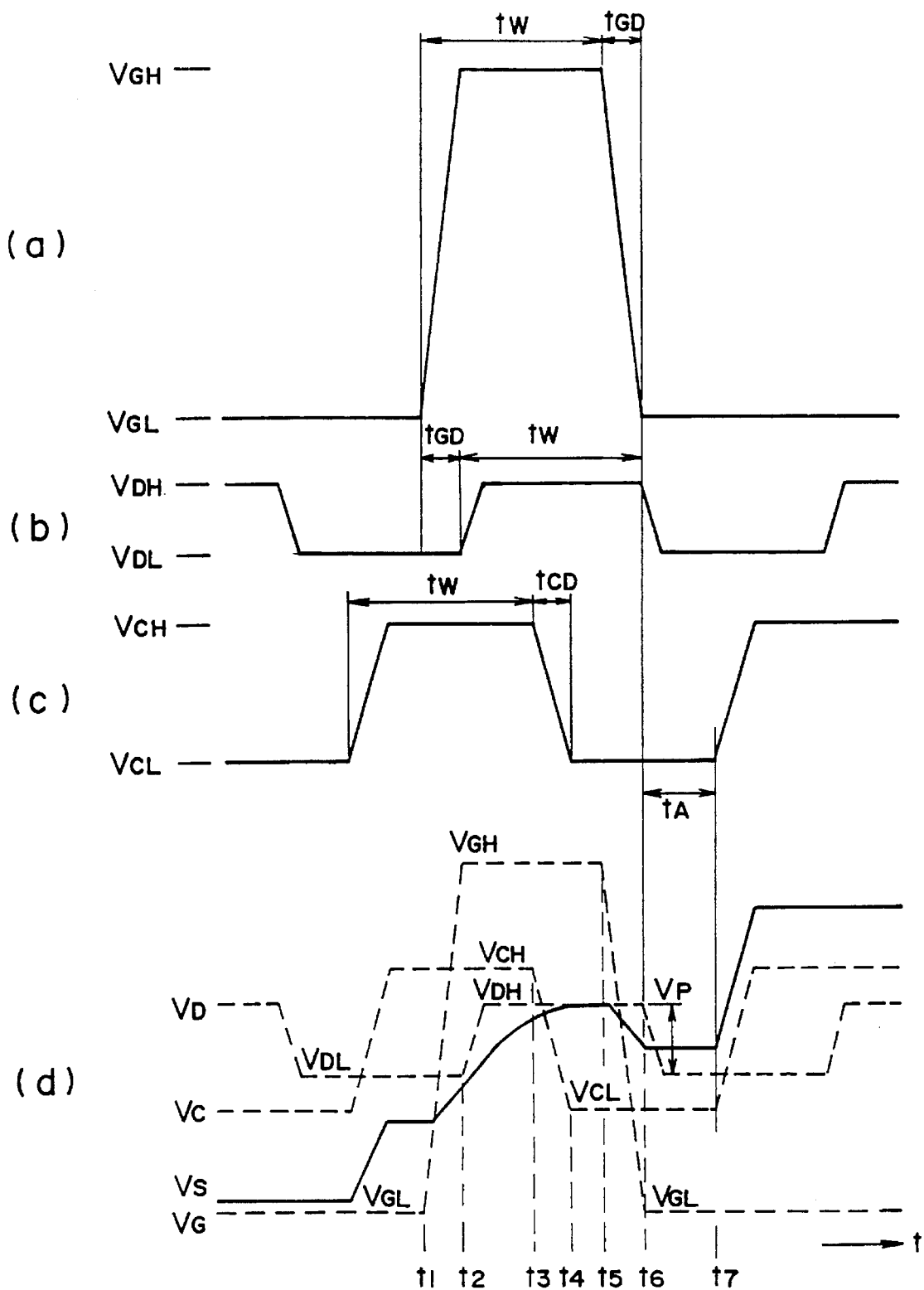
FIG. 26 is a chart showing driving signal waveforms used in an embodiment of the present invention.

FIG. 26 shows the waveforms of driving voltages used in an embodiment of the present invention. (a) of FIG. 26 is the waveform of a voltage applied to the gate electrode (scan line), (b) is the waveform of a voltage applied to the drain electrode (signal line), (c) is the waveform of a voltage applied to the common electrode signal line, and (d) shows the relative relation among those waveforms, in which those overlapped waveforms are shown by dotted lines and the waveform of a voltage applied to the source electrode is shown by a real line. At a time t1, the gate electrode starts to rise from an OFF voltage VGL to an ON voltage VGH, when the writing is started. Hence, the source electrode is started to change toward the potential of the drain electrode. The gate electrode reaches the ON voltage VGH at a time t2.

At the time t2, the drain electrode start to shift its voltage to a desired voltage VDH. A certain lag time later, the voltage of the drain electrode reaches VDH. At a time t3, the common electrode starts to shift its voltage from the voltage VCH to VCL. A lag time tCD later, the voltage of the common electrode reaches VCL. The writing is continued until, at a time t5, the voltage of the gate electrode shifts from the ON voltage VGH to the OFF voltage VGL. During the interval, the voltage of the source electrode reaches a desired voltage VDH.

Figure 27:
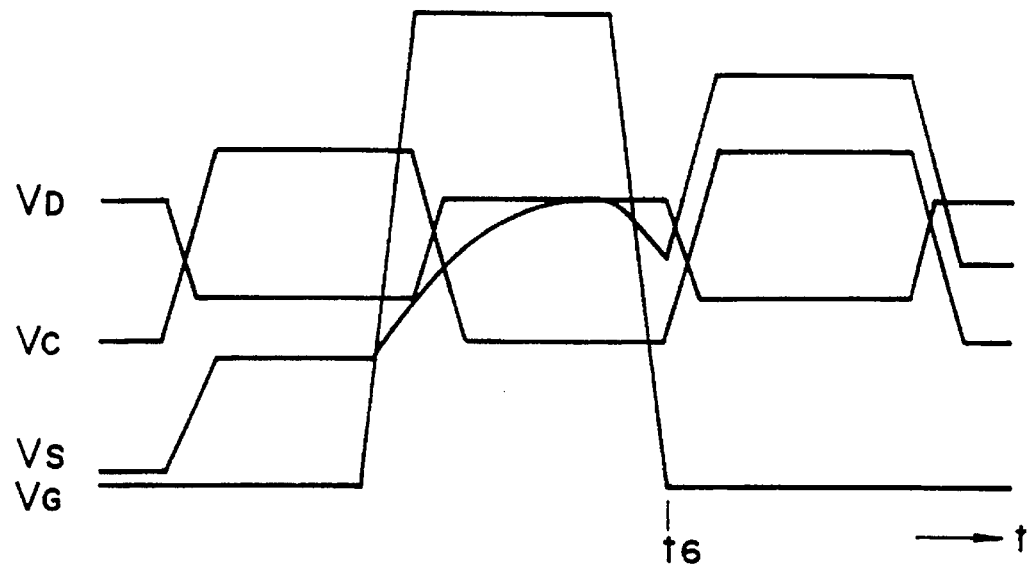
FIG. 27 is a chart showing driving signal waveforms used in the conventional liquid crystal display device.

Between the time t4 and the time t5 when the writing is completed, the driving waveforms of the voltages used in this embodiment are at the positive polarity. At the time t5, a desired voltage VDH-VCL is applied to the liquid crystal element and the storage capacitance element. The pulse width (½ of one period) of each voltage of the drain electrode and the common electrode is identical to the writing time tW (t5-t1 when one scan signal line is selected). At the time t5, the voltage of the gate electrode starts to drop from the ON voltage VGH. A lag time tGD later, at a time t6, the voltage of the gate electrode returns to the OFF voltage VGL. During the interval, the voltage of the source electrode drops by just a coupling voltage Vp because of electrostatic induction. At a time t6, the voltage of the gate electrode remains OFF. When the coupling is terminated, the voltage of the drain electrode starts to change. At a time t7, a certain time tA later than the time t6, the voltage of the common electrode starts to shift from the voltage VCL to VCH, when the voltage of the source electrode starts to change because of the electrostatic induction. A certain time tA later than the termination of the coupling, the voltage of the source electrode starts to change. Hence, the slippage of timing of the driving waveform of the voltage of the common electrode has no effect on the driving waveform of the voltage of the source electrode. FIG. 27 shows the conventional driving waveform. The voltage waveform applied to the drain electrode is synchronous to that applied to the common electrode so that the voltages of the drain and the common electrodes start to change at a time. Hence, at the time t6, after the jumping operation, the voltage of the source electrode starts to rise. It means that the modulation of the driving waveform is likely to effect on the voltage of the source electrode. The lag time tA of the voltage of the common electrode against the voltage of the drain electrode is zero (for the conventional method) or larger but smaller than the one scan line selecting time tW minus the lag time tGD of the signal line (drain electrode) against the scan line (gate electrode) and the maximum lag time tCD of the common electrode. In actual, the voltage of the common electrode compensates for the coupling voltage and is set somewhat low for removing the d.c.components of the voltage applied to the liquid crystal. That is, the voltage of the common electrode is adjusted to the optimal common voltage.

Figure 28:
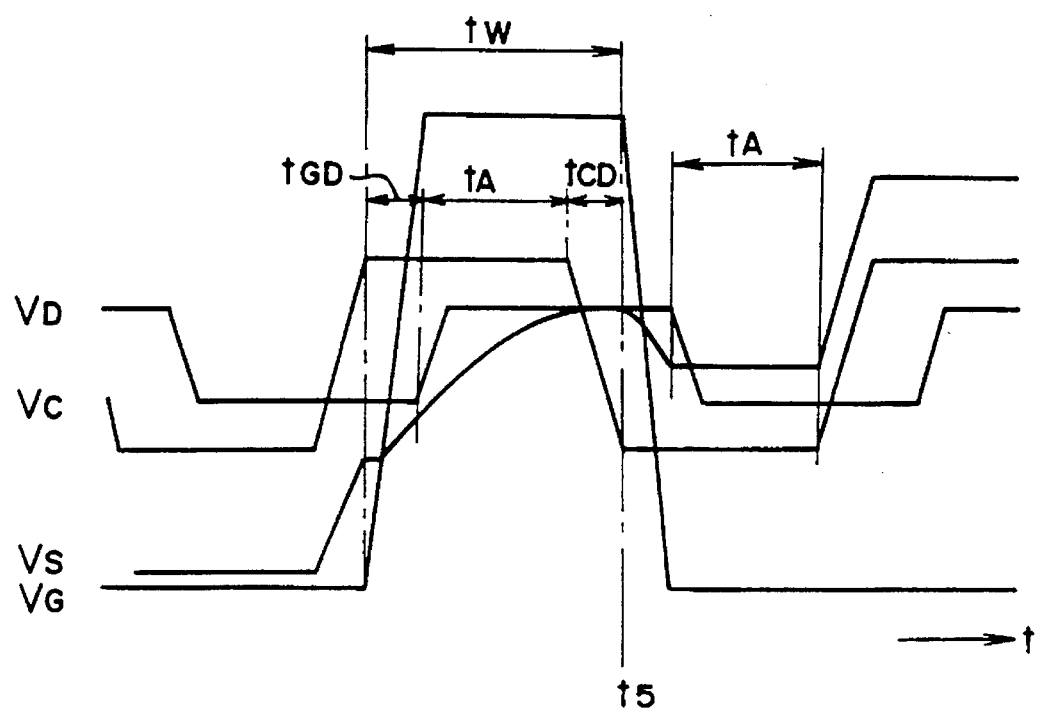
FIG. 28 is a chart showing driving signal waveforms used in another embodiment of the present invention.

FIG. 28 shows the waveform when the lag time tA of the voltage of the common electrode against the voltage of the drain electrode is maximum, that is, the one scan signal line selecting time tW minus the lag time tCD of the signal line (drain electrode) against the scan line (gate electrode) in the embodiment of the present invention. In this case, at the time t5 when the writing is terminated, the voltage of the common voltage Vc reaches a predetermined voltage. Also in this case, the voltage of the source electrode starts to change a certain time tA later than the termination of the coupling. Hence, the slippage of the timing of the driving waveform of the voltage of the common electrode has no effect on the waveform of the voltage of the source electrode. In this embodiment, while the voltage is at the positive polarity (after the writing is terminated), the difference among the voltages of the common electrode, the drain electrode and the source electrode is made small. Hence, it is unlikely that the thin film transistor having as a gate the common electrode formed on the color filter side glass substrate carries out the parasitic MOS operation. It results in keeping the holding characteristic stable.

Figure 29:
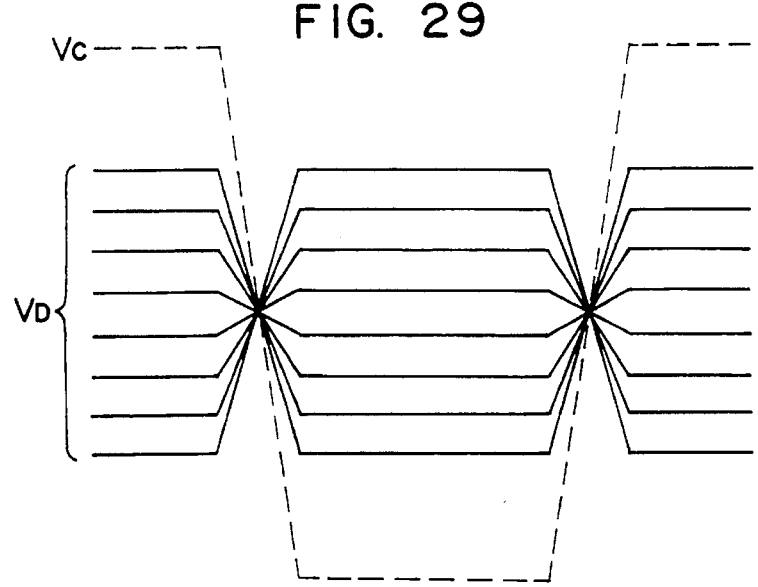
FIG. 29 is a chart showing an example of a display signal used in the present invention.

The potential of the drain electrode defines the potential of the source electrode, that is, the transparent pixel electrode for each pixel. To realize the multi-color display, this potential is divided into several tones. Each tone voltage is defined depending on how the light transmittance of the liquid crystal depends on the voltage applied to the liquid crystal. The voltage applied to the liquid crystal is defined depending on the potential difference between the signal line and the common electrode line. Since the common electrode line is common to all the pixels, the change of the potential applied on the signal line results in the division of the potential into several tones. FIG. 29 shows one example of the division. The potential difference between the signal line and the common electrode line is divided into eight tones. The voltage applied on the common electrode line defines the potential setting of the signal line. In FIG. 29, the fourth or less tones are in the same phase as the common electrode line. That is, by keeping the potential of at least one tone to be in the same phase as the common electrode line, the difference between the ON voltage of the gate and the writing voltage is kept constant for any tone, resulting in reducing the dependency of the jump voltage on the display signal potential.

Figure 30:
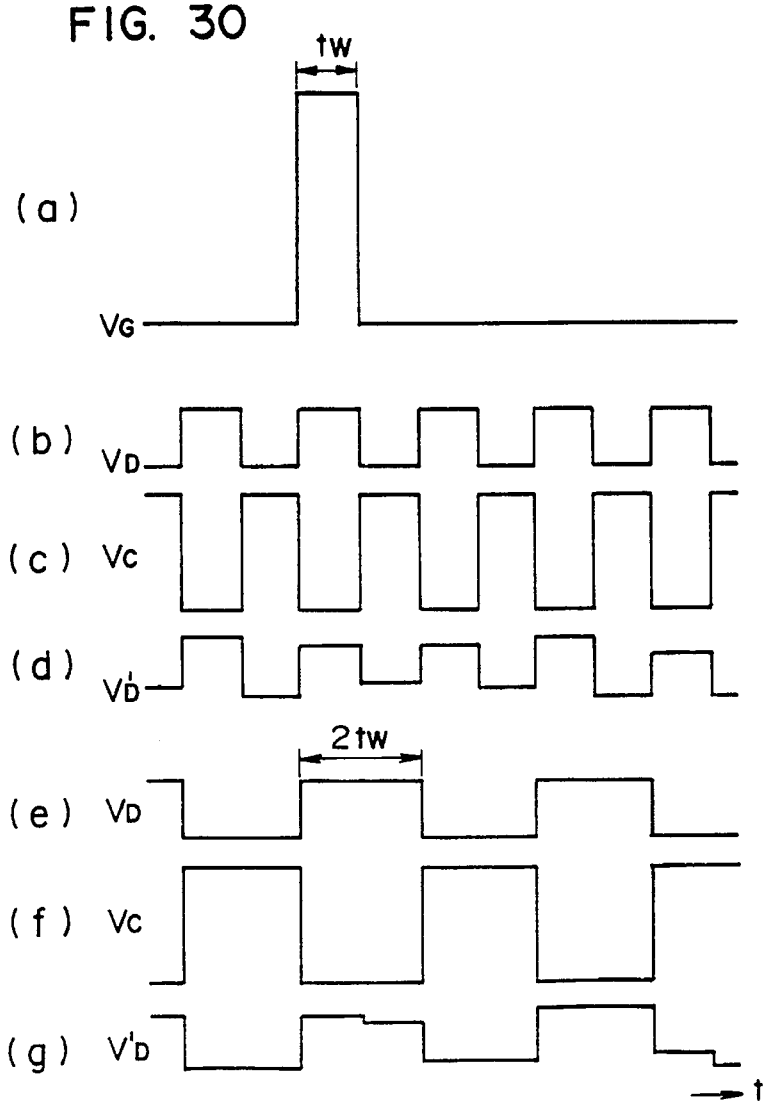
FIG. 30 is a chart showing driving signal waveforms used in another embodiment of the present invention.

FIG. 30 shows the driving waveform of the voltages used in another embodiment. In FIG. 30, (a) denotes a waveform of a voltage applied at the gate electrode, (b), (c) and (d) denote waveforms of the voltages used in the conventional driving method. Concretely, (b) denotes a waveform of a voltage applied on the drain electrode if the luminance on the overall surface is constant, (c) denotes a waveform of a voltage applied to the common electrode, and (d) denotes a waveform of a voltage applied to the drain electrode if the luminance on the surface is variable. (e), (f) and (g) denote the waveforms of voltages used in the driving method according to the present invention. Concretely, (e) denotes a waveform of a voltage applied on the drain electrode when the luminance on the overall surface is constant, (f) denotes a waveform of a voltage applied on the common electrode, and (g) denotes a waveform of a voltage applied on the drain electrode when the luminance on the surface is variable. In the present embodiment, the waveforms of (e), (f) and (g) are twice as large as the pulse width (selecting time for one scan line) on the common electrode. That is, the conventional writing sequence is a positive polarity, a negative polarity, a positive polarity, and a negative polarity for each scan line, while the present writing sequence is a positive polarity, a positive polarity, a negative polarity, and a negative polarity for each scan line. It results in halving the driving frequency and thereby conserving the power consumption of the driving circuit. As shown in (e) of FIG. 30, the present driving frequency of the voltage applied on the drain electrode is half as large as the conventional driving frequency if the luminance on the overall surface is constant, while in actual, the present driving frequency is as large as the conventional driving frequency, because the luminance on the surface is variable. In case of the high-definition liquid crystal device, the tone difference between the adjacent pixels is small. Hence, as shown in (g) of FIG. 30, the driving frequency is substantially reduced in half, resulting in making it possible to conserve the power consumption of the driving circuit. The pulse width of the voltage of the common electrode is n times as large as the waveform pulse width (selecting time for one scan line) of the voltage applied on the gate electrode. n denotes a divisor of all the scan lines. According to the present embodiment, n is 2. It may be possible to combine the method of the present embodiment with the asynchronization of the potential of the common electrode.

Next, the direction will be directed to the arrangement of the storage capacitance element which is suitable to reduction of the short-circuit between the wires and the watermark and improvement of a yield.

Figure 31:
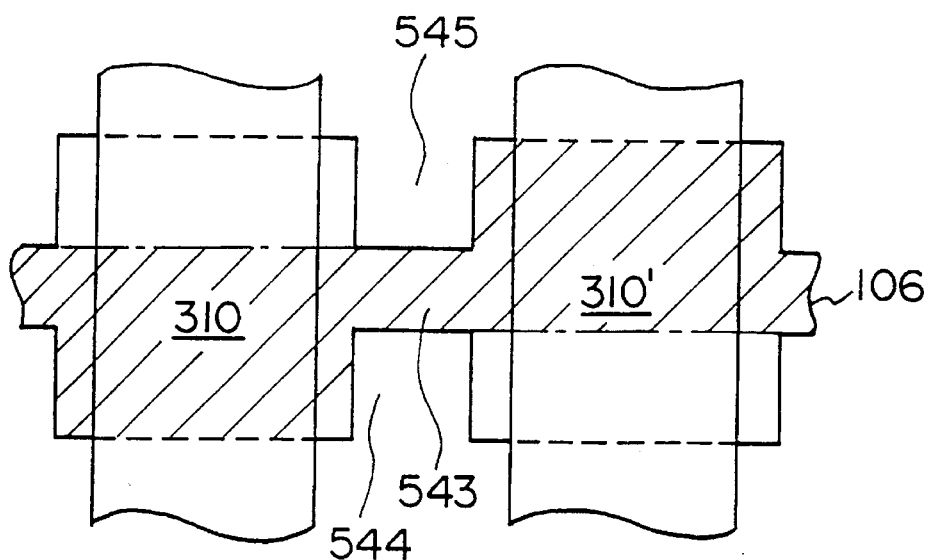
FIG. 31 is a view showing another embodiment of the storage capacitance element used in the present invention.

FIG. 31 shows an embodiment of the present invention. As shown, the storage capacitance element 310 is ranged horizontally at a pixel pitch. The storage capacitance line 106 extends horizontally so as to compose one electrode of the storage capacitance element 310 contained in each pixel. 543 denotes a connecting portion between the pixels of the storage capacitance line 106. The connecting portion 543 is made more slender than the electrode portion of the storage capacitance element 310 and is connected at the vertically central position of the right and the left ends of the storage capacitance element 310. The storage capacitance line 106 and the scan line 101 are alternately ranged at the substantially same intervals. The connecting portion 543 of the storage capacitance line 106 is located at the vertically central portion of the right and the left ends of the storage capacitance element. 544 and 545 denote valley portions resulting from the step of the storage capacitance line 106. The valley portions 544, 545 are, on the average, made shorter because of the foregoing location of the connecting portion 543. Hence, in the process for manufacturing the thin film transistor, there is a low probability that the liquid for washing and etching stays in the concave portion, which results in causing failure. The locating method of the storage capacitance element according to the invention makes it possible to reduce the short-circuit between the wires and the water mark, thereby improving the yield.

As shown by the oblique lines of FIG. 31, the storage capacitance element 310 may be located on the upper or the lower side of the adjacent pixel. The upper end and the lower end of the connecting portion 543 of the storage capacitance line 106 match to the upper end of the storage capacitance element 310 and the lower end of the storage capacitance element 310'. Hence, the connecting portion 543 provides no valley portion resulting from the step of the storage capacitance line 106 so that no etching liquid is substantially allowed to stay in the process of manufacturing the thin film transistor, resulting in making it difficult to cause failure. The locating method of the storage capacitance element according to the present invention serves to reduce the watermark and improve a yield. In the present embodiment, the storage capacitance elements are located in such a manner that those elements are alternately slipped in the vertical manner. This location results in dividing the opening portion by the storage capacitance element so that the opening portion is difficult to be visible, thereby avoiding the lowering of the resolution.

Next, the description will be directed to the arrangement of the storage capacitance element which is capable of preferably preventing the discontinuity of the display portion and the degradation of a resolution.

Figure 32:
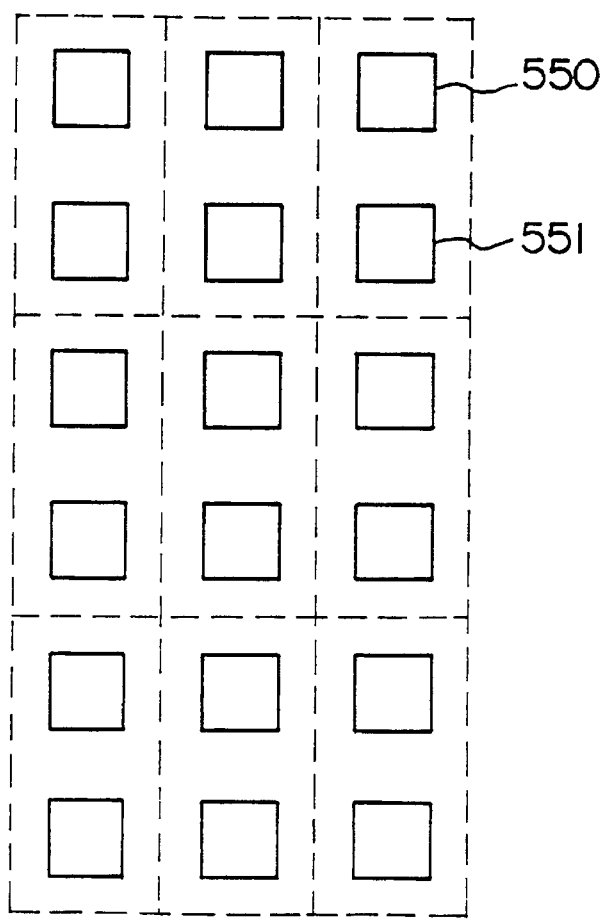
FIG. 32 is an explanatory view showing another embodiment of the present invention.

FIG. 32 shows an embodiment of the present invention. Each pixel is shown by a broken line of FIG. 32 in which only the opening portions (where the light is transmitted) 550, 551 are shown. As shown, each pixel has two opening portions. The opening portions included in all the pixels are located at regular intervals. The width of the thin film transistor portion, which serves as the light-screening portion, is substantially equivalent to the width of the storage capacitance element. The display is therefore divided by the narrow widths so as to prevent the lowering of the resolution.

The foregoing embodiments have described that the insulating film of the storage capacitance element is a silicon nitride film or a compound film composed of a silicon nitride film and an $Al_2O_3$ film formed by anodizing Al. The insulating film of the storage capacitance element, however, employs an $Al_2O_3$ film, a silicon nitride film, a compound film composed of a silicon nitride film and an $Al_2O_3$ film formed by anodizing Al, a Ta-anodized film, a compound film composed of a silicon nitride film and a Ta-anodized film, a compound film composed of a silicon nitride film and a Ta-anodized film, or a compound film composed of three or more layers. In other words, if the insulating film employs any film, the present invention keeps effective. Further, the common electrode line may be any compound film composed of Al, Ta, Cr or ITO or two metals of Ta, Cr and ITO. In particular, the compound film composed of ITO and another metal is advantageous in improving a numerical aperture, because the ITO is a transparent electrode. In case the potential of the common electrode line is varied by the same frequency as the signal potential, however, it is desirous that the resistance of the common electrode line is 2Ω or more per one pixel for preventing the uneven display resulting from the delay of a signal within the substrate. To design the storage capacitance element, however, it is necessary to properly design the dimension of the connecting portion of the common electrode line in the consideration of the sheet resistance of the common electrode line in order that the resistance is 2Ω or more per one pixel.

As the size of one pixel is reduced as a result of making the display more definitive, the opening portion, that is, the display portion where light is transmitted is made smaller. Hence, it is necessary to take care of the form of the opening portion. In general, when the orientation film is subject to rubbing for orienting the liquid crystal molecules in the proper direction, the rubbing makes the display uneven near the step portion, resulting in often bringing about the orientation abnormal (domain). Hence, when the opening portion is made small, it is necessary to take care of occurrence of the domain. The storage capacitance element is located in a manner to allow the minimum width of the opening portion of the pixel to be 25 μm or more. In case the minimum width of the orientated portion of the pixel is 25 μm or more, the almost of the opening portion is formed at the location far off the step portion. It results in allowing the even rubbing to be done, thereby eliminating the possibility of occurrence of an orientation abnormal.

Since the common electrode line is common to all the pixels within the display panel, the pull-out portion of the end portion of the display panel is required to be designed so as to prevent the signal waveform of the common electrode line from being distorted. That is, in case the minimum width of the pull-out portion of the common electrode line is larger than the minimum width of the display panel, the distortion of the signal waveform is likely to take place. because the signal delay resulting from the wire resistance of the pull-out portion is small.

Figure 33A:
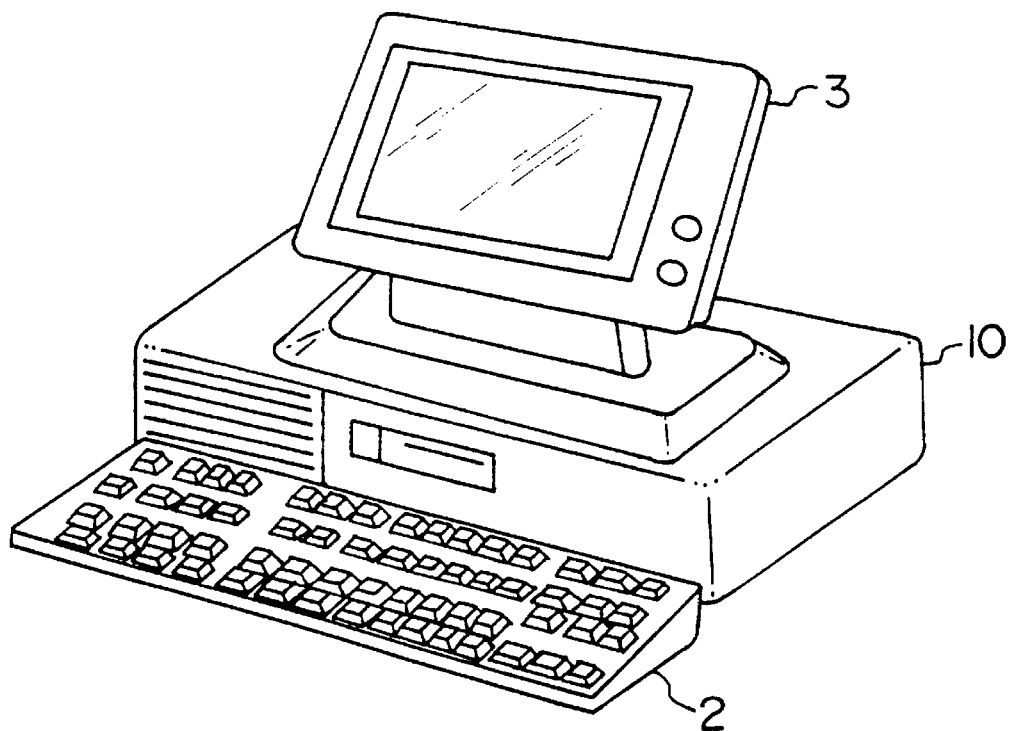
FIGS. 33A and 33B are views showing a device to which the liquid crystal display according to the present invention is applied.
Figure 33B:
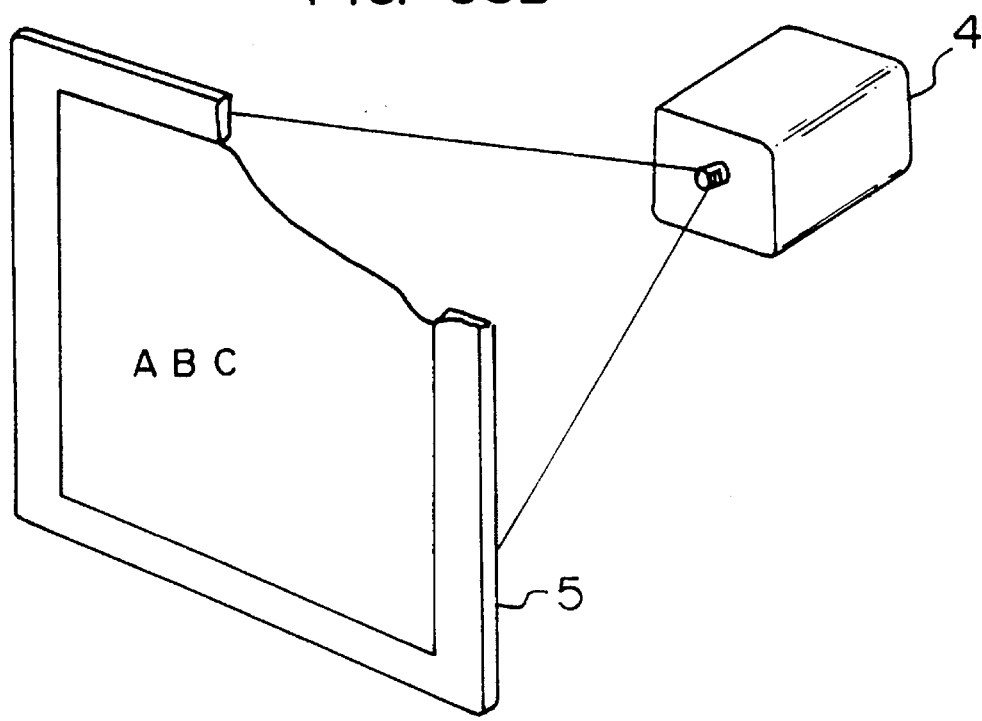

FIGS. 33A and 33B show the system to which the liquid crystal display according to the invention is applied.

FIG. 33A shows the embodiment where the liquid crystal display is applied to the display unit of the desk-top computer. As shown, this embodiment includes a computer main unit 10, a keyboard 2, and a liquid crystal display 3. In comparison with the conventional cathode-ray tube (referred to as CRT), the liquid crystal display according to the embodiment is advantageous in that it is lightweight and occupies less area. The feature of the liquid crystal display is more effective for the system wherein two or more operators can work with one computer main unit 10 by using two or more keyboards 2 and liquid crystal displays 3 or the lap-top computer which requires a more lightweight display. By applying the liquid crystal display to the display portion of the computer, therefore, it is possible to realize a lightweight and space-saving personal computer.

FIG. 33B shows another example to which the liquid crystal display according to the invention is applied. In this example, the liquid crystal display is used in part of a light shutter of the projective type display. The arrangement of the system includes a projecting unit 4 having the liquid crystal display and an optical system, a screen 5, and a video signal processing unit (not shown). A video signal inputted from the external is converted into a proper signal format required for displaying an image on the liquid crystal display, for example, a non-interlaced RGB digital signal and then the image is displayed on the liquid crystal display depending on the converted signal format. The displayed image is focused on the screen through the optical system. Of those components, the light shutter portion is a main factor for defining the dimension of the optical system. The light shutter portion and thereby the overall optical system may be reduced in size by using the liquid crystal display where a lot of pixels are accommodated in a small panel.

Further, since the liquid crystal display is lightweight and small in size, the use of the liquid crystal display results in realizing a color small TV monitor or a large tapestry type TV.

As will be appreciated from the above description, the present invention makes it possible to reduce leakage of light resulting from the slippage of the upper and lower substrates from the proper positions and leakage of light directed in an oblique direction, resulting in implementing a color display with a high contrast ratio. Since the numerical aperture can be enlarged, the liquid crystal display can provide brighter display. The invention can conserve the power consumption of the backlight source, resulting in conserving the power consumption of the overall device.

Moreover, the present invention also makes it possible to reduce the variation of an optimal common potential on the plane and thereby the fluctuation of the optimal common potential and the threshold value. The short-circuit between the wires and the water mark are reduced, resulting in improving the yield. In addition, it is possible to prevent the discontinuity of the display portion, thereby allowing the degradation of the resolution to be prevented.

What is claimed is:

1. A liquid crystal display device for displaying an image comprising:

a first substrate including a thin film transistor, a plurality of scan lines, a plurality of signal lines, and a plurality of pixel electrodes connected to said thin film transistor, a second substrate including a transparent common electrode, a liquid crystal which is sealed between said first and second substrates, a first opaque body of a stripe-shape extending in a longer direction of said pixel electrode formed on said first substrate, a second opaque body having opening portion arranged in a matrix manner formed on said second substrate, and wherein said first opaque body and said second opaque body are disposed to overlap with each other.

2. A liquid crystal display device according to claim 1, wherein a storage capacitance line is located on said first substrate between adjacent scan lines for controlling said thin film transistor and said first opaque body is electrically separated from said storage capacitance line and said scan line and overlapped with a pixel electrode.

3. A liquid crystal display device according to claim 2, wherein a peripheral length of a capacitance portion of a storage capacitance element composed between said storage capacitance line and a common electrode formed on the second substrate is set to be 1.33 or less times as large as a value obtained by dividing an area of said capacitance portion by a size of a diagonal length of the area having said pixel electrodes located thereon.

4. A liquid crystal display device according to claim 3, wherein the capacitance portion of said storage capacitance element is composed of an overlapped portion of two electrodes opposed to each other and having different widths and lengths.

5. A liquid crystal display device according to claim 3, wherein said signal lines are located in a vertical direction, in parallel, and at regular intervals, said scan lines are located in a horizontal direction substantially perpendicular to said signal lines, in parallel, and at regular intervals, and said common electrodes are located in substantially parallel to said scan lines and in an alternate direction with said scan lines.

6. A liquid crystal display device according to claim 3, wherein a vertical width of said storage capacitance element is a value obtained by dividing the area of the capacitance portion of said storage capacitance element by a horizontal width of said common electrode and the connecting portion between said common electrode and said storage capacitance element is located on a substantially center in the vertical direction of the vertical end portion of said storage capacitance element.

7. A liquid crystal display device according to claim 3, wherein a vertical width of the portion where no light is transmitted in the portion having said thin film transistor formed thereon is substantially equivalent to a vertical width of a light-screening portion of said storage capacitance element, said thin film transistor portion not serving as a display portion is separated from said storage capacitance element, and the separation interval is substantially identical for each pixel electrode.

8. A liquid crystal display device according to claim 3, wherein a vertical end portion opposed to the common electrode composing one pixel electrode of said storage capacitance element composes parallel lines and a horizontal end portion opposed to the transparent pixel electrode forming the other electrode of said storage capacitance element also composes parallel lines.

9. A liquid crystal display device according to claim 3, wherein said storage capacitance element is located on a substantially center of the pixel electrode.

10. A liquid crystal display device according to claim 1, wherein a storage capacitance line is located on said first substrate between adjacent scan lines for controlling said thin film transistor and part of said storage capacitance line is overlapped with a pixel electrode.

11. A liquid crystal display device according to claim 1, wherein a corner area of the opening portion of the second opaque body formed on the second substrate is directed in an oblique manner or is formed to have a light-screening portion with two or more corners.

12. A liquid crystal display device according to claim 1, wherein the projection of said first opaque body onto the second substrate is overlapped with said second opaque body on an edge of said pixel electrodes.

13. A liquid crystal display device according to claim 1, wherein the width of the second opaque body is larger than an alignment margin of the first substrate and the second substrate in manufacturing the liquid crystal display device.

14. A liquid crystal display device according to claim 1, wherein either one of said first opaque body and second opaque body is divided into two or more portions.

15. A liquid crystal display device according to claim 1, wherein said first opaque body is disposed along an edge of said opening portions of said second opaque body.

16. A liquid crystal display device according to claim 1, wherein said first opaque body is disposed so that a part of said first opaque body overlaps with said pixel electrodes.

17. A liquid crystal display device according to claim 16, wherein said opening portions of said second opaque body are disposed so that at least a part of said opening portions is positioned inside of an overlapped region of said first opaque body and said pixel electrodes.

18. A liquid crystal display device according to claim 17, further comprising:

a light source disposed at an opposite side of said first substrate with respect to said second substrate, wherein an edge of the opening portion of said second opaque body is positioned spaced from an edge of said overlapped region by at least a predetermined distance to prevent a light beam from said light source from reaching the opening portion.

19. A liquid crystal display device according to claim 1, wherein said opening portions of said second opaque body have opposite edges expanding outwardly to form convex-shaped portions at positions opposing to each other.

20. A liquid crystal display device according to claim 19, wherein said first opaque body is disposed along said convex-shaped portions of the edge of said opening portions.

21. A liquid crystal display device as claimed in claim 1, wherein said second opaque body has said opening portions smaller than said pixel electrodes.

22. A liquid crystal display device according to claim 1, comprising a pair of first constituent bodies constituting said first opaque body and disposed corresponding to opening portions of second constituent bodies constituting said second opaque body, wherein widths of said opening portions are shorter than a distance between said pair of first constituent bodies.

23. A liquid crystal display device according to claim 1, further comprising a back light, wherein a width of the second opaque body is smaller than a distance which an incident light incident obliquely on said liquid crystal display device from said backlight propagates in parallel with a surface of said first substrate or a surface of said second substrate when said incident light passes through said liquid crystal.

24. An information processing apparatus including an information input means for inputting information, an information processing means for processing said information, and a display means for displaying said information, said display means including a first substrate having a thin film transistor, a plurality of scan lines, a plurality of signal lines, and a plurality of pixel electrodes connected to said thin film transistor, a second substrate including a transparent common electrode, and a liquid crystal sealed between said first substrate and said second substrate, a first opaque body of a stripe-shape extending in a longer direction of said pixel electrodes formed on said first substrate, a second opaque body having opening portions arranged in a matrix manner formed on the second substrate, and wherein said first opaque body and said second opaque body are disposed to overlap each other.

25. A projective type display using a liquid crystal display device as a light shutter, said liquid crystal display device comprising:

a first substrate including a thin film transistor, a plurality of scan lines, a plurality of signal lines, and a plurality of pixel electrodes connected to said thin film transistor, a second substrate including a transparent common electrode, and a liquid crystal sealed between said first and second substrates, a first opaque body of a stripe-shape extending in a longer direction of said pixel electrodes formed on said first substrate, a second opaque body having opening portions located in a matrix manner formed on said second substrate, and wherein said first opaque body and said second opaque body are disposed to overlap with each other.

26. A liquid crystal display device comprising:

a first substrate including a plurality of scan lines, a plurality of signal lines intersecting said scan lines, a thin film transistor formed at each intersecting portion of said scan lines and said signal lines, said thin film transistor being connected to corresponding ones of said scan lines and said signal lines, and a pixel electrode connected to said thin film transistor, a second substrate including a transparent common electrode, a liquid crystal sealed between said first and said second substrates, and a light source positioned at an opposite side of said first substrate with respect to said second substrate, a first opaque body of a stripe-shaped layout formed on said first substrate so that a part of said first opaque body overlaps with said pixel electrode, a second opaque body having opening portions located in a matrix manner formed on said second substrate so that said opening portions are positioned inside of an overlapped region of said first opaque body and said pixel electrode, and an edge of said opening portions is positioned spaced from an edge of the overlapped region by at least a predetermined distance to prevent a light beam from said light source from reaching the opening portion.

27. A liquid crystal display device including pixel electrodes controlled by active elements being located in a matrix manner, comprising:

a first substrate having said active elements formed thereon, a second substrate opposed to said first substrate, a first opaque body of a stripe shape formed on said first substrate on an area other than an area on which said active elements are formed, a second opaque body having opening portions located in a matrix manner, and formed on said second substrate, wherein a projection of said first opaque body onto the second substrate is overlapped with said second opaque body in the vicinity of an edge of said pixel electrodes.

28. A liquid crystal display device according to claim 27, wherein either one of said first opaque body and said second opaque body is divided into two or more portions.

29. A liquid crystal display device comprising:

a first substrate including at least a thin film transistor, a plurality of scan lines, a plurality of signal lines, and a plurality of pixel electrodes connected to said thin film transistor, a first opaque body of stripe shape for screening light applied from a backlight source formed on an area other than an area on which said thin film transistor is formed, a second substrate including at least a color filter and a transparent electrode, a liquid crystal sealed between both of said substrates, and a second opaque body having opening portions located in a matrix manner on the second substrate, wherein a projection of said first opaque body onto the second substrate is overlapped with said second opaque body in the of an edge of the pixel electrodes.

\* \* \* \* \*

UNITED STATES PATENT AND TRADEMARK OFFICE
CERTIFICATE OF CORRECTION

PATENT NO. : 5,561,440         Page 1 of 5
DATED : October 1, 1996
INVENTOR(S) : KITAJIMA et al.

It is certified that error appears in the above-indentified patent and that said Letters Patent is hereby corrected as shown below:

In the drawings, sheet 1, Fig. 1, the reference numeral attached to the "Information Processing System" should be changed from "220" to --40--, and a lead line should be applied between the "signal circuit" and reference numeral "207", to appear as follows:

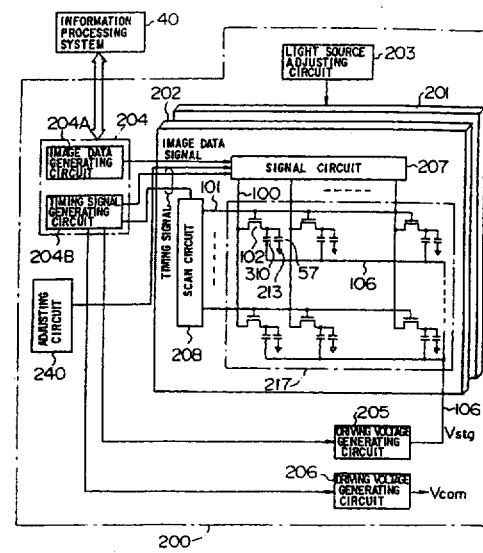

FIG. 1

UNITED STATES PATENT AND TRADEMARK OFFICE
CERTIFICATE OF CORRECTION

PATENT NO. : 5,561,440
DATED : October 1, 1996
INVENTOR(S) : KITAJIMA et al.

It is certified that error appears in the above-indentified patent and that said Letters Patent is hereby corrected as shown below:

In the drawings, sheet 2, Fig. 2, the reference numeral "207B" should be applied to the bottom "Signal Circuit", to appear as follows:

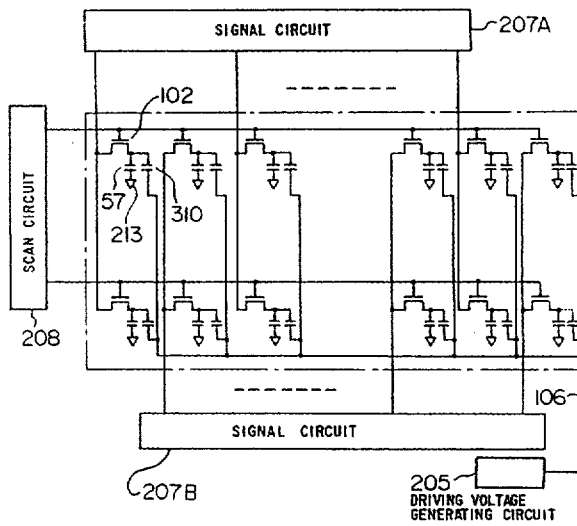

FIG. 2

UNITED STATES PATENT AND TRADEMARK OFFICE
CERTIFICATE OF CORRECTION

PATENT NO. : 5,561,440

DATED : October 1, 1996

INVENTOR(S) : KITJIMA et al.

It is certified that error appears in the above-indentified patent and that said Letters Patent is hereby corrected as shown below:

In the drawings, sheet 3, Fig. 3, the reference numeral "203" should be corrected to --230--, to appear as follows:

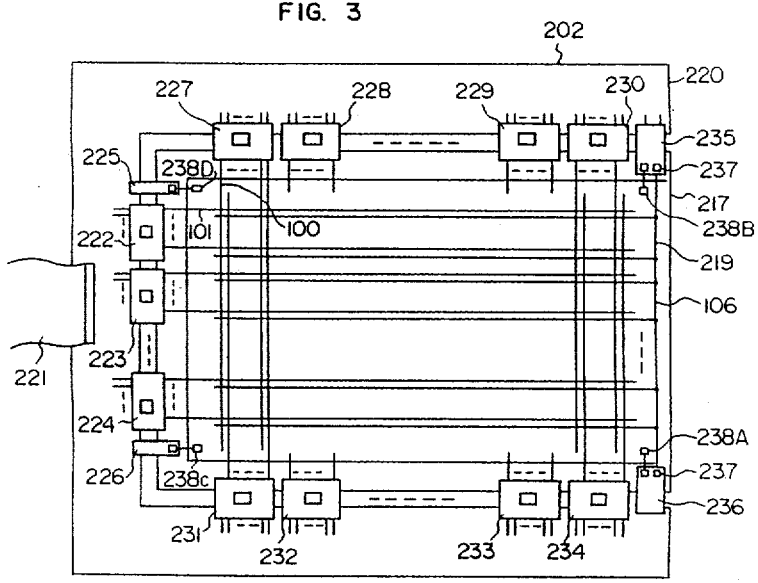

FIG. 3

UNITED STATES PATENT AND TRADEMARK OFFICE
CERTIFICATE OF CORRECTION

PATENT NO. : 5,561,440    Page 4 of 5
DATED : October 1, 1996
INVENTOR(S) : KITAJIMA et al.

It is certified that error appears in the above-indentified patent and that said Letters Patent is hereby corrected as shown below:

In the drawings, sheet 7, Fig. 9, correct the boundaries of the layer 59, to appear as follows:

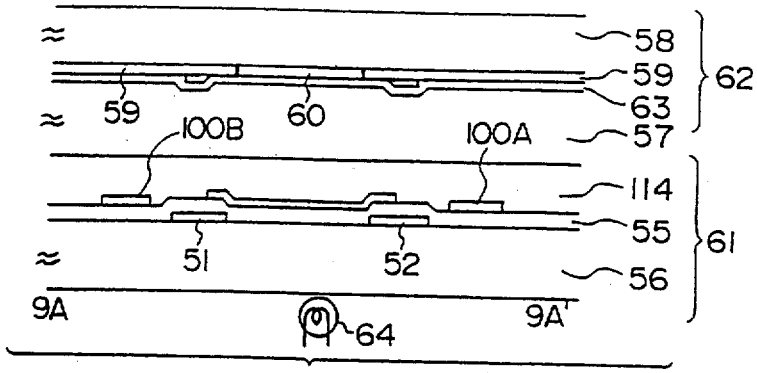

FIG. 9

UNITED STATES PATENT AND TRADEMARK OFFICE
CERTIFICATE OF CORRECTION

PATENT NO.   : 5,561,440
DATED        : October 1, 1996
INVENTOR(S)  : KITAJIMA et al.

It is certified that error appears in the above-indentified patent and that said Letters Patent is hereby corrected as shown below:

```
Column 2, line 9, change "time" to --times--.
Column 3, line 62, change "200" to --40--.
Column 4, line 47, delete "are".
Column 7, line 23, change "11C-11C'" to --11C-11C' sectional-lines,
 respectively--.
Column 8, line 14, change "describing" to --above-described--.
Column 12, line 58, change "time" to --times--.
```

Signed and Sealed this

Seventh Day of July, 1998

*Attest:*

*Attesting Officer*

BRUCE LEHMAN

*Commissioner of Patents and Trademarks*